US011459947B2

(12) United States Patent
Lee

(10) Patent No.: US 11,459,947 B2
(45) Date of Patent: Oct. 4, 2022

(54) ROTARY POWER GENERATING APPARATUS AND METHODS OF MAKING AND USING THE SAME

(71) Applicant: Brent Wei-Teh Lee, Saratoga, CA (US)

(72) Inventor: Brent Wei-Teh Lee, Saratoga, CA (US)

( * ) Notice: Subject to any disclaimer, the term of this patent is extended or adjusted under 35 U.S.C. 154(b) by 0 days.

(21) Appl. No.: 17/217,885

(22) Filed: Mar. 30, 2021

(65) Prior Publication Data

US 2022/0120216 A1  Apr. 21, 2022

Related U.S. Application Data

(60) Provisional application No. 63/205,969, filed on Jan. 21, 2021, provisional application No. 63/204,633, filed on Oct. 16, 2020.

(51) Int. Cl.
*F02C 3/16* (2006.01)
*F02C 7/264* (2006.01)
(Continued)

(52) U.S. Cl.
CPC ............... *F02C 3/165* (2013.01); *F02C 3/16* (2013.01); *F02C 7/222* (2013.01); *F02C 7/264* (2013.01); *F03D 1/0608* (2013.01); *F03D 7/0276* (2013.01); *F03D 9/25* (2016.05); *F05B 2220/704* (2013.01); *F05B 2220/706* (2013.01); *F05D 2240/242* (2013.01)

(58) Field of Classification Search
CPC .......... F02C 3/16; F02C 3/165; F03D 1/0608; F03D 7/0276; F05D 2240/242
See application file for complete search history.

(56) References Cited

U.S. PATENT DOCUMENTS 1,021,521 A * 3/1912 Heoult ................. F02C 5/04
                                              60/39.34
2,465,856 A * 3/1949 Emigh .................. F02K 7/005
                                              416/22
(Continued)

OTHER PUBLICATIONS

Brent Wei-Teh Lee; "Rotary Engine, Apparatus Including the Same, and Methods of Making and Using the Same"; U.S. Appl. No. 16/951,808, filed Nov. 18, 2020; 48 pgs.

*Primary Examiner* — Steven M Sutherland
(74) *Attorney, Agent, or Firm* — Andrew D. Fortney; Central California IP Group, P.C.

(57) ABSTRACT

An engine is disclosed. The engine includes a rotary hub enclosing a manifold, blades radially distributed around the rotary hub, a combustion chamber at a distal end of each blade, an axle or shaft joined or fixed to the hub, and a generator operably connected to the axle or shaft. Each blade has a passage for air to flow to the combustion chamber and a fuel distribution conduit therein/thereon. The manifold connects a fuel supply conduit to the fuel distribution conduits. Each combustion chamber is configured to receive fuel and air from the corresponding fuel distribution conduit and passage, burn or detonate the fuel, and direct heated or expanded air and combustion gases in a direction that rotates the blades and the hub. The axle or shaft is configured to rotate with the hub. The generator is configured to convert a torque from the axle or shaft to electricity.

19 Claims, 10 Drawing Sheets

(51) Int. Cl.
*F02C 7/22* (2006.01)
F03D 1/06 (2006.01)
*F03D 9/25* (2016.01)
*F03D 7/02* (2006.01)

(56) References Cited

U.S. PATENT DOCUMENTS

| | | | | |
|---|---|---|---|---|
| 2,474,685 A | * | 6/1949 | McCollum | F02K 7/005 416/21 |
| 2,481,235 A | * | 9/1949 | Parr | F02K 7/005 60/39.34 |
| 2,582,893 A | * | 1/1952 | Teague | B64C 11/00 416/22 |
| 3,699,771 A | * | 10/1972 | Chelminski | F02K 7/005 60/39.35 |
| 5,408,824 A | * | 4/1995 | Schlote | F02C 3/165 60/39.35 |
| 2003/0010013 A1 | * | 1/2003 | Johnstone | F02C 3/165 60/39.35 |

* cited by examiner

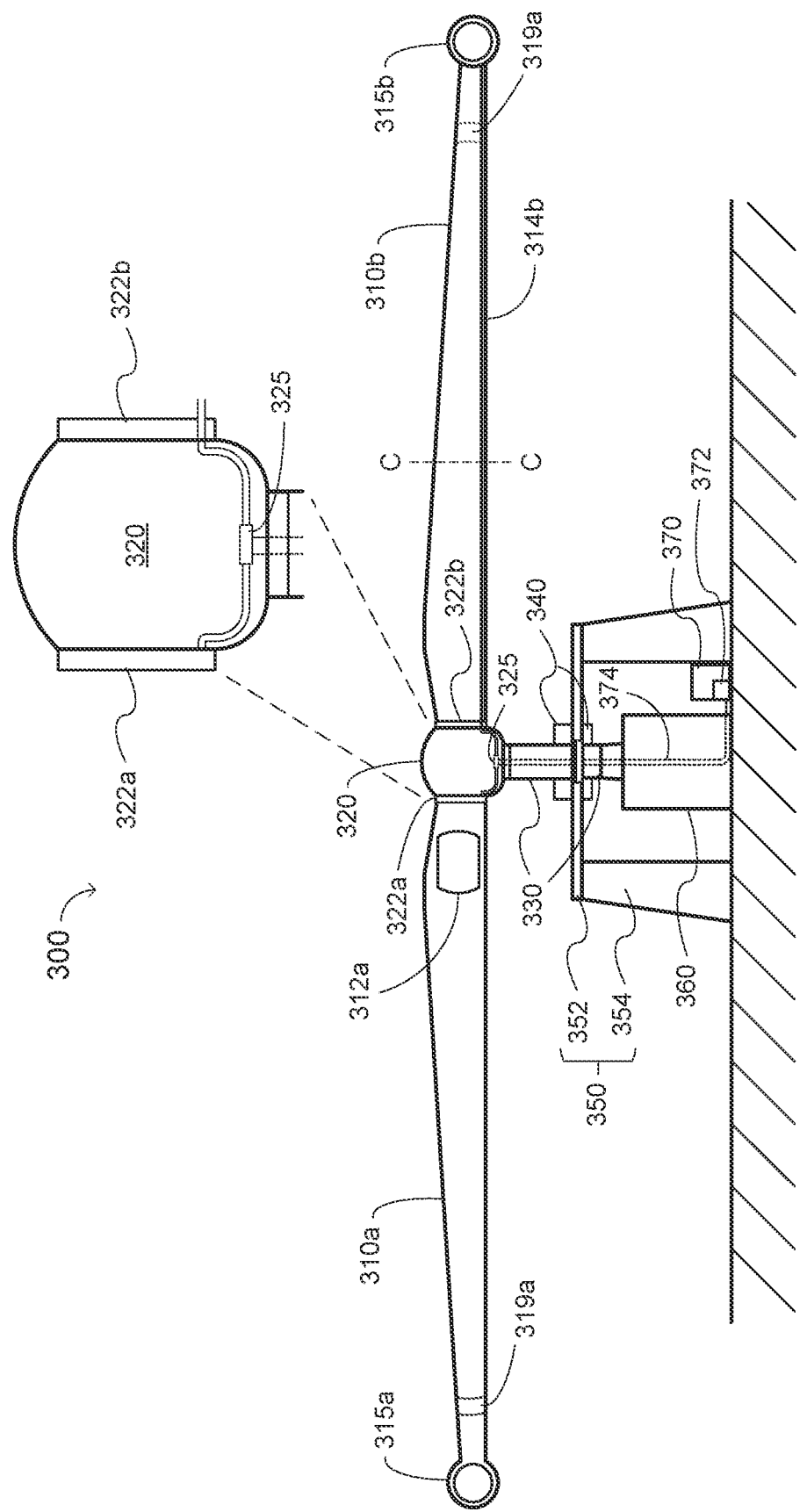

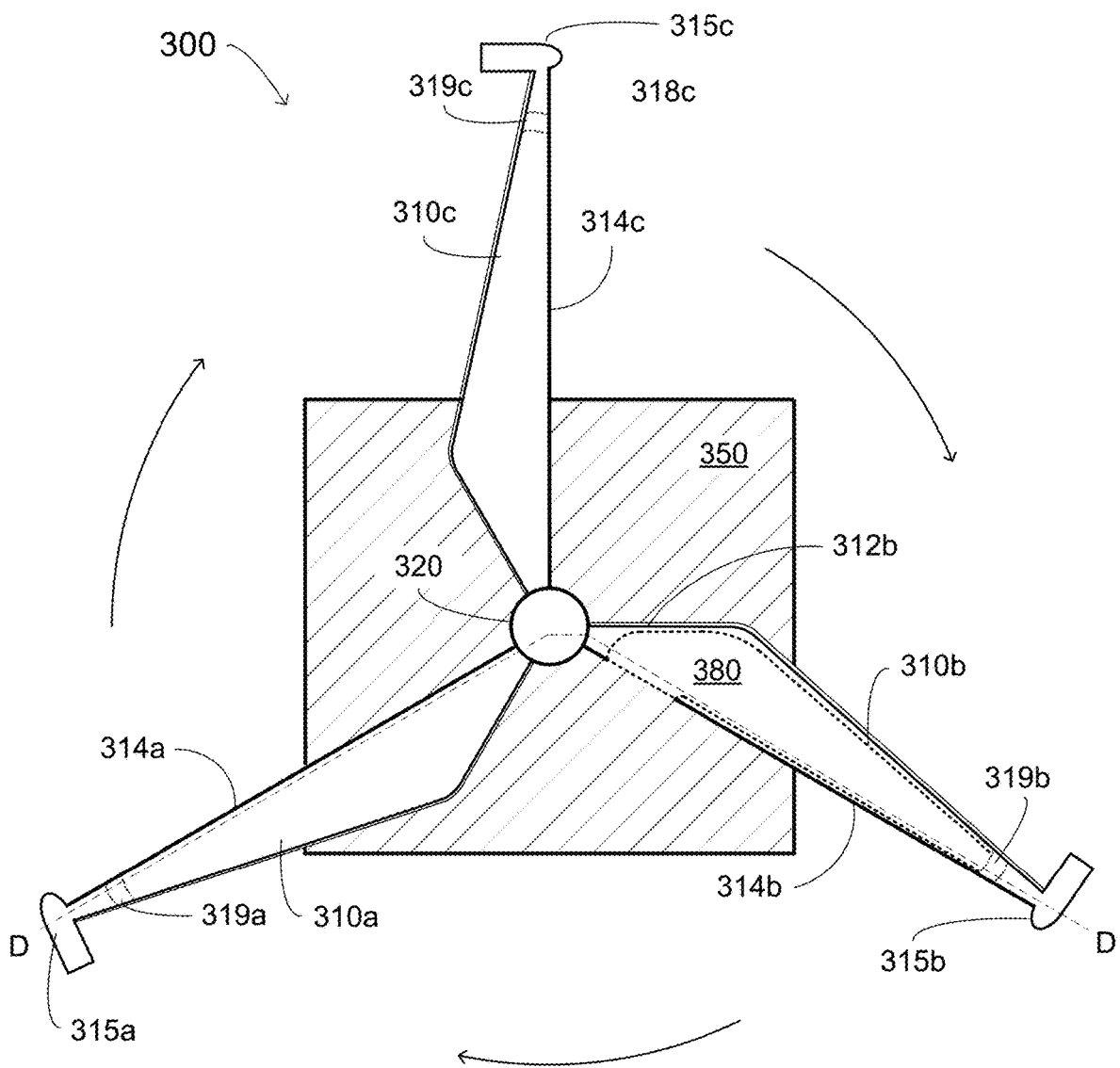
FIG. 4B
FIG. 5A
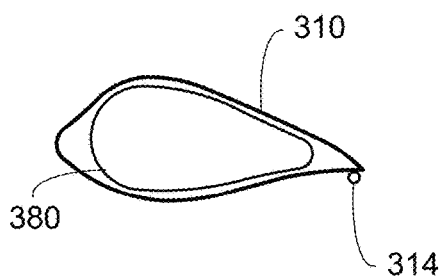
FIG. 5B

ROTARY POWER GENERATING APPARATUS AND METHODS OF MAKING AND USING THE SAME

CROSS REFERENCE TO RELATED APPLICATION

This application claims the benefit of U.S. Provisional Patent Application Nos. 63/204,633 and 63/205,969, respectively filed on Oct. 16, 2020 and Jan. 21, 2021, each of which is incorporated herein by reference as if fully set forth herein.

FIELD OF THE INVENTION

The present invention generally relates to the field of power generation. More specifically, embodiments of the present invention pertain to a rotary power generation apparatus including a plurality of blades, methods for converting energy and/or generating electricity using the same, and methods of making the same.

DISCUSSION OF THE BACKGROUND

Wind turbines are manufactured in a wide range of designs, in which the blades of the turbines can rotate around either a horizontal axis or vertical axis. Modern commercial applications of wind turbines focus more on designs in which the blades rotate around a horizontal axis.

FIG. 1A shows a typical horizontal wind turbine 100 for electricity generation. The horizontal wind turbine 100 includes three blades 110, a hub 120 to which the blades 110 are attached, a nacelle 130 that houses the electricity-generating equipment, and a tower 140 supporting the nacelle 130, hub 120 and blades 110. Together, the blades 110 and the hub 120 form a rotor.

FIG. 1B shows the interior of a typical nacelle 130 on the tower 140 of a horizontal wind turbine. The components in the nacelle 130 include a low-speed (or main) shaft 125 connected to and rotating with the hub 120, a gear box 150, a brake 160, a high-speed shaft 170, a generator 180, and a yaw bearing and motor 190 that maintain or change the direction of the nacelle 130, depending on the direction of the wind. The gear box 150 transfers torque from the low-speed shaft 125 to the high-speed shaft 170, frequently increasing the rate of rotation of the low-speed shaft 125 by a factor of 50-foled to 100-fold or more in the high-speed shaft 170. Electricity generated by the generator 180 is carried by an electrical cable (not shown) to a battery (for storage) or to an inverter or converter for transfer to an electrical grid. Some horizontal wind turbines further include for each blade 110 a pitch bearing (not shown) bolted to the hub 120. A pitch bearing (or, perhaps more accurately, a motor controlling the position of the pitch bearing) adjusts the pitch (angle of attack) of the blade 110 relative to the direction of the wind, according to the wind speed, to control the rotational speed of the rotor. Typically, operations of the brake 160, the yaw bearing and motor 190, and (when present) the pitch bearing or pitch bearing motor are controlled by a controller (not shown) that typically receives wind speed and direction information from an anemometer (not shown) mounted on or connected to the nacelle 130.

A predominant trend in development of turbines such as horizontal wind turbine 100 has been to increase the blade length and the tower height for higher power generation. From 1990 to 2016, the blade/rotor diameter of 24 meters increased to 109 meters, and power generation of 50 kW in 1990 increased to 2848 kW in 2016.

FIGS. 2A-B are diagrams showing an apparatus according to U.S. patent application Ser. No. 16/951,808, filed Nov. 18, 2020, the relevant portions of which are incorporated herein by reference. FIGS. 2A-B show an exemplary show an exemplary engine 200 with an internal compressor 220. FIG. 2A is a cross-sectional view of the exemplary engine 200 in FIG. 2B along the line A-A. The engine 200 comprises an inlet 202 with an opening 205, a compressor 220 comprising a plurality of fins/blades 222a-h, an upper axle or shaft 210, a lower axle or shaft 215, a rotary disc and/or housing 240, a plurality of conduits (e.g., curved rotary arms) 250a-f, a divider 245, a plurality of nozzles 255a-f, and a plurality of combustion chambers 260a-f. A fluid, such as air, exhaust and/or combustion gases, enters the housing 240 through the opening 205. As the fluid passes through the housing 240 into the rotary arms 250a-f, then through the rotary arms 250a-f and out through the nozzles 255a-f, the housing 240 begins to rotate, as does the compressor 220. The centrifugal force provided by the rotating housing 240 and rotary arms 250a-f causes the fluid to move even more readily to the circumference of the housing 240 and out through the nozzles 255a-f, thereby providing a kind of amplifying effect to the rate of rotation of the housing 240 and rotary arms 250a-f. Each combustion chamber 260a-f is between a corresponding rotary arm 250a-f and a corresponding nozzle 255a-f.

Referring now to FIG. 2B, each of the rotary arms 250a-f has a combustion chamber 260a-f at a distal end thereof. The nozzles 255a-f are respectively at the exhaust or output end of the respective combustion chambers 260a-f. Air or other combustion gas (e.g., oxygen, oxygen-rich air, a mixture of nitrogen and oxygen [e.g., scuba nitrox], ozone, a nitrogen oxide such as NO or $NO_2$, mixtures thereof, etc.) enters the combustion chambers 260a-f through holes in the nose 261 of the combustion chambers 260a-f. Alternatively, each of the combustion chambers 260a-f may have a single opening (e.g., an inlet or entrance) in the upstream end thereof, as long as there is some kind of constriction or partial closure at the entrance of the combustion chamber 260a-f. Fuel is supplied to the combustion chambers 260a-f through fuel supply lines 265a-f.

FIG. 3 shows a plan (top-down) view of a combustion chamber that is useful in the exemplary engine of FIGS. 2A-B. For example, FIG. 3 shows a top-down view of the distal end of the rotary arm 250, the combustion chamber 260, and the nozzle 255. The combustion chamber 260 may also have a diameter (e.g., an outer diameter) or width equal to a diameter (e.g., an inner diameter) of the rotary arm 250. There may be a constriction or narrowed section 252 between the combustion chamber 260 and the nozzle 255.

The combustion chamber 260 may have a front or nose 261 with holes or inlets 266 therein. Alternatively, the front or nose 261 of the combustion chamber 260 may have a single opening, and comprise a constriction or narrowing in the rotary arm 250. The holes/openings 266 allow compressed air or other oxygen-containing gas to enter the combustion chamber 260 somewhat freely, although in the absence of combustion, the pressure of the gas in the combustion chamber 260 is less than the pressure of the gas in the rotary arm 250 just before the front or nose 261.

Fuel is supplied to the combustion chamber 260 by the fuel supply line 265 through an inlet (not shown). The inlet may be below (or pass through) a port 268 in the wall of the combustion chamber 260. Given the gas compression caused by the centrifugal force of the rotating rotary arms 250 and the force with which the gas emerges from the nozzles 250 in the absence of any combustion, the additional force and/or thrust provided by combustion in the combustion chambers 260 may increase dramatically, even when very little fuel is burned. The fuel may also be compressed, pressurized and/or accelerated by centrifugal force, as the fuel supply line 265 runs along and/or is affixed to the rotary arm 250. The fuel may be delivered continuously or in short pulses, but in general, the larger the amount of fuel supplied during a pulse, the less frequently the fuel is supplied.

An ignition source (e.g., a spark plug or other gap between electrical conductors) 262 may ignite the mixture of fuel and oxygen-containing gas (e.g., air) in the combustion chamber 260. An electrical wire (not shown) affixed to the outside of the rotary arm 250 and the housing 240 may provide an electrical charge to the ignition source 262. In some cases, the fuel may auto-ignite or auto-detonate after a relatively small number of ignition cycles (e.g., 1-5), when the combustion chamber 260 gets sufficiently hot.

Torque is proportional to the product of a force causing rotation of a rotor (e.g., the force applied by the gases exiting the nozzles 255a-f onto the rotary arms 250a-f) and the radius of the rotor. In the engine 200, when the radius of the engine 200 (i.e., the distance from the center of the axle/shaft 210/215 to the end of each nozzle 255a-f) exceeds a relatively high threshold (e.g., 100 meters), a relatively small amount of fuel along with a relatively highly compressed air supply (e.g., at a pressure of 5 atm or more at the entrances to the rotary arms 250a-f) generates significantly more torque than a smaller, but otherwise identical, system. Therefore, the length of the rotary arms 250a-f plays an important role, because the centrifugal force applied to the gas in the rotary arms 250a-f is directly proportional to the radius of the engine 200 when the engine 200 rotates. As a result, when the rotary arms have a relatively large length and the engine 200 has a relatively large radius, the gas in the rotary arms 250a-f at the end of the arm is under great pressure because of centrifugal force, even at relatively low rotational rates. The longer the arm/radius, the denser the compressed gas.

The rotary arms 250a-f can be constructed with lightweight and strong materials, such as those used to make blades for wind turbines (e.g., glass fiber- and/or carbon fiber-reinforced polymer resins, such as polyesters, epoxy resins, etc.). Similar to large-radius wind turbines, the engine 200 can provide mechanical force, energy or power for a megawatt power plant when the radius is sufficiently large (e.g., at least 100 meters). Given that the power output by the engine 200 increases exponentially with an increase in the radius, a rotary arm length of at least 80 m may be preferred for electricity generation. Such arm lengths are believed to be able to provide gas pressures of 6-8 atm or more in the rotary arms at the end of the arms, immediately before the nozzles, even at relatively low rates of rotation.

It may be beneficial to apply some or all of the operational principles of the engine 200 to existing structures and/or components. This can advantageously reduce the costs and time of developing and constructing a power generating apparatus.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to an engine, comprising a rotary hub enclosing a manifold, a plurality of blades, an axle or shaft joined or fixed to the hub, and a generator operably connected to the axle or shaft, configured to convert a torque from the axle or shaft to electricity. The manifold receives a fuel supply conduit and has a plurality of outlets, each connected to one of a corresponding plurality of fuel distribution conduits. The blades are radially distributed around the hub. Each of the blades has (i) a first end joined or fixed to the hub, (ii) a passage for air to flow to a second, distal end of the blade, (iii) one of the fuel distribution conduits therein or thereon, and (iv) a combustion chamber at the second, distal end of the blade. Each combustion chamber is configured to (I) receive fuel from a corresponding one of the fuel distribution conduits and air from the passage in the corresponding one of the blades, (II) burn or detonate the fuel, and (III) direct heated or expanded air and combustion gases in a direction that rotates the blades and the hub. The axle or shaft is configured to rotate with the hub.

In some embodiments, the engine further comprises a housing configured to house and/or isolate the generator. In various examples, the housing includes a roof or upper frame and a plurality of supports that support the roof or upper frame above the generator. In such examples, the axle or shaft may extend from the hub, through the roof or upper frame, and the roof or upper frame may secure a first bearing configured to seal the axle or shaft and allow the axle or shaft to rotate. In general, such a housing supports blades that rotate in a horizontal plane (e.g., horizontally-rotating blades, in a so-called "horizontal engine").

Alternatively, the engine further comprises a tower configured to support the rotary hub, the blades, and the axle or shaft. In such alternative embodiments, the blades rotate in a vertical plane (e.g., vertically-rotating blades, in a so-called "vertical engine"), and the engine (with or without the generator) may resemble a conventional horizontal wind turbine (HWT). In further embodiments, the vertical engine further comprises a transmission, differential and/or gear box configured to transfer the torque from the axle or shaft to a high-speed shaft adapted to rotate at a faster rate than the axle or shaft driven by the rotary hub. The vertical engine may further comprise a nacelle housing at least part of the axle or shaft, the transmission, differential and/or gear box, and optionally, the generator. Optionally, the vertical engine may further comprise an anemometer configured to measure a wind speed, a controller configured to control operation(s) of the vertical engine based at least in part on the wind speed, and/or a brake (which may also be housed in the nacelle) configured to stop rotation of the hub and the blades mechanically, electrically or hydraulically (e.g., when the wind speed exceeds a predetermined safety threshold value).

In general, each of the combustion chambers comprises a nozzle at an end thereof. In various embodiments, the nozzles may be configured to direct the heated or expanded air and combustion gases exiting the combustion chamber in a direction (i) tangential or substantially tangential to a circle defined by rotational movement of the combustion chamber or (ii) perpendicular or substantially perpendicular to a central axis of the corresponding blade. In some embodiments, each of the nozzles has a maximum outer diameter that is equal to or less than a maximum outer diameter of the remainder of the combustion chamber. When the combustion chambers comprise a nozzle, the nozzle may further comprise a constriction at an inlet thereof. Typically, the number of blades, the number of passages, the number of fuel distribution conduits, the number of combustion chambers, and the number of nozzles (when present) are equal or the same (e.g., they are in a 1:1 relationship).

In various embodiments, the engine comprises x blades, wherein x is a positive integer by which 360 can be divided to give an integer or a regular fraction. For example, the engine may comprise at least three (e.g., 3, 4, 5, 6, 8, 9, 10, or 12) blades. Each of the blades may have a length of from 1 to 150 m, and the hub may have an effective diameter (i.e., twice the distance from the center to the most distant point in a plan view) of from 10 to 800 cm. The engine is intended to be relatively large, and in embodiments that are intended for commercial electricity generation, the blades may have a length of from 60 to 120 m (or any length or range of lengths therein), and the hub may have a diameter of from 300 to 600 cm (or any length or range of lengths therein). Each of the blades generally has the same dimensions and shape, and may be (but is not necessarily) designed to provide at least some aerodynamic lift.

In some embodiments, each of the blades has an opening on a side of the blade facing a direction of rotation that allows the air to enter the passage. Alternatively, the hub may have a main opening in a surface thereof and a plurality of internal openings therein (e.g., at interfaces between the hub and each of the blades) that allows the air to enter the passages.

In various embodiments, each of the passages has a width, a length and/or a height that is 50-98% of a corresponding width, length and/or height of the corresponding blade, and each of the fuel distribution conduits may have a width, diameter or cross-sectional area that is 1-10% of the width, diameter or cross-sectional area of the corresponding passage.

In some embodiments, the engine may further comprise a fuel storage tank or vessel and/or a pump. The fuel storage tank or vessel may have an outlet and/or valve operably connected to the fuel supply conduit, and may be in the housing. The pump may be configured to receive the fuel from the fuel storage tank or vessel, and output the fuel into the fuel supply conduit.

In other or further embodiments, each of the plurality of combustion chambers may comprise (i) an outer shell with an opening or port therein and (ii) an inner wall inside the outer shell. The outer shell may be configured to receive the corresponding fuel distribution conduit or allow the corresponding fuel distribution conduit to pass therethrough. The inner wall may have a plurality of openings therein configured to allow the air to pass through the inner wall. The outer shell and the inner wall may have a channel between them through which the air flows, and the inner wall may define a zone (e.g., a combustion or detonation zone) in which the fuel is ignited, burned or detonated. In some additional or alternative embodiments, each of the combustion chambers may further comprise (i) a port and/or fuel inlet configured to receive the fuel from the corresponding fuel distribution conduit and (ii) an igniter configured to ignite the fuel in the combustion chamber. The igniter may be downstream from the port and/or fuel inlet.

In other or further embodiments, the engine may further comprise a battery configured to provide an electrical charge to each igniter. Alternatively or additionally, the engine may further comprise a different battery configured to store electrical charge from the generator.

A still further aspect of the present invention concerns a method of generating electricity, comprising igniting, burning or detonating a fuel in a plurality of combustion chambers, each at a distal end of a corresponding one of a plurality of blades connected to and radially distributed around a rotary hub, expelling (i) air heated or expanded in the combustion chambers and (ii) combustion gases from the combustion chambers, flowing the air through a passage in each of the blades to the combustion chambers, distributing the fuel from a manifold in the hub to the combustion chambers through corresponding fuel distribution conduits in or on the corresponding blades, rotating an axle or shaft joined or fixed to the hub to generate a torque, and converting the torque to electricity using a generator. The heated or expanded air and the combustion gases are expelled in a direction that rotates the blades and the hub.

In various embodiments, the method may further comprise supplying the fuel to the manifold through a fuel supply conduit, pumping the fuel from a fuel storage tank or vessel into a fuel supply conduit in fluid communication with the manifold, storing said fuel in the fuel storage tank or vessel, injecting the fuel into the combustion chambers from the corresponding fuel distribution conduits, igniting the fuel in the combustion chambers using a corresponding plurality of igniters, providing an electrical charge to each of the igniters, drawing the air into the passage in each of the blades through an opening on a side of each blade facing a direction of rotation of the blades, directing the heated or expanded air and combustion gases through a nozzle at an end of a corresponding one of the plurality of combustion chambers in a direction (i) tangential or substantially tangential to a circle defined by rotational movement of the combustion chamber or (ii) perpendicular or substantially perpendicular to a central axis of the corresponding blade, and/or storing the electricity from the generator in a battery.

In some embodiments (e.g., related to the "horizontal engine" described herein), the method may further comprise supporting and/or stabilizing the axle or shaft by passing the axle or shaft through a bearing in a roof or upper frame of a housing configured to house and/or isolate the generator. In such embodiments, similar to the present engine, the housing may further include a plurality of supports that support the roof or upper frame above the generator.

Alternatively, the method may further comprise supporting the rotary hub, the plurality of blades, and the axle or shaft with a tower. In such alternative embodiments (e.g., in the "vertical engine"), the method may comprise rotating the blades in a vertical plane, and the method may further comprise housing at least part of the axle or shaft, a transmission, differential and/or gear box, and optionally the generator, in a nacelle. In further embodiments, the method further comprises transferring the torque from the axle or shaft to a high-speed shaft using a transmission, differential and/or gear box, and rotating the high-speed shaft at a faster rate than that of the axle or shaft. Optionally, the method may further comprise measuring a wind speed with an anemometer, and controlling one or more operations (e.g., ignition, combustion or detonation of the fuel) using a controller, based at least in part on the wind speed. In some embodiments, the method may further comprise stopping rotation of the hub and the blades mechanically, electrically or hydraulically (e.g., when the wind speed exceeds a predetermined safety threshold value) with a brake.

In some embodiments, similar to the present engine, each of the combustion chambers may comprise an outer shell and an inner wall inside the outer shell. In such embodiments, the method may further comprise (i) flowing the air into a channel between the outer shell and the inner wall, (ii) allowing at least some of air heated in the channel to exit the combustion chamber through an outlet outside of the nozzle, (iii) passing some of the air through a plurality of openings in the inner wall, and/or (iv) igniting or burning the fuel into a zone within the inner wall. Similar to the present engine, each nozzle may have a maximum outer diameter that is equal to or less than a maximum outer diameter of the remainder of the combustion chamber. The nozzles may also comprise a constriction at an inlet thereof.

As for the present engine, the plurality of blades in the present method may comprise x blades, where x is a positive integer by which 360 can be divided to give an integer or a regular fraction. Thus, x may be at least three (e.g., 3, 4, 5, 6, 8, 9, 10 or 12). Each of the blades in the present method may have a length of from 1 to 150 m, and the hub may have a diameter of from 10 to 800 cm. However, the blades may have a cross-sectional shape (i.e., as defined by its outermost surfaces) that differs from a conventional blade (e.g., for the same type of structure, such as a wind turbine or vehicle).

The present invention advantageously augments existing wind power technology to generate a relatively large amount of electricity in low wind conditions, and enables use of existing wind power technology to generate electricity in the absence of wind, with minimal changes. The present invention also advantageously enables use of existing wind power technology without the need for a tower, thereby eliminating the safety and other risks associated with the tower in horizontal wind turbines (HWTs). These and other advantages of the present invention will become readily apparent from the detailed description of various embodiments below.

BRIEF DESCRIPTION OF THE DRAWINGS

FIGS. 4A-B show an exemplary horizontally-rotating engine according to one or more embodiments of the present invention.

FIGS. 5A-B show cross-sections of alternative blades according to one or more embodiments of the present invention.

DETAILED DESCRIPTION

Figure 1A:
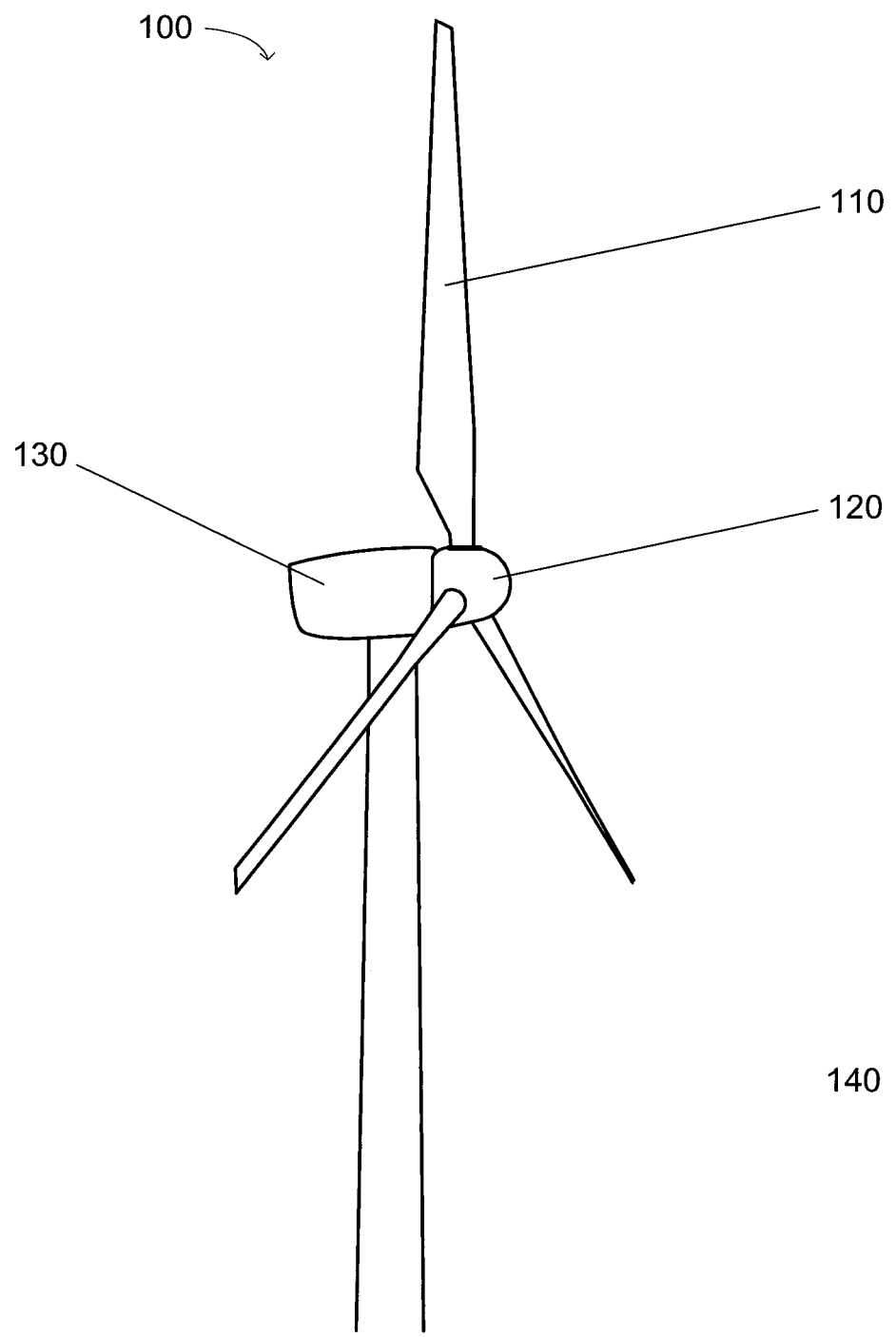
FIGS. 1A-B are diagrams showing a conventional horizontal wind turbine (HWT).

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

The term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

For the sake of convenience and simplicity, the terms "axle," "shaft," and "axis" are generally used interchangeably herein, but are generally given their art-recognized meanings. Also, for convenience and simplicity, the terms "connected to," "coupled with," "coupled to," "joined to," "attached to," "fixed to," "affixed to," "in communication with," and grammatical variations thereof may be used interchangeably, and refer to both direct and indirect connections, couplings, joints, attachments and communications (unless the context of its use unambiguously indicates otherwise), but these terms are also generally given their art-recognized meanings.

The terms "lower" and "upper" are used herein as convenient labels for the same or similar structures having a relative position to the other(s) as shown in the drawings, but which can change their relative position(s) depending on the orientation of the apparatus or other structure in the drawing(s). Similarly, the terms "downstream" and "upstream" are convenient labels for relative positions of two or more components of the apparatus/engine with respect to the flow of one or more gas(es) or fluid(s) within the apparatus/engine.

The present invention concerns an engine somewhat similar to the apparatuses disclosed in U.S. patent application Ser. No. 16/951,808, the relevant portions of which are incorporated herein by reference. However, the present engine is intended to improve current wind turbine technology, to enable it to function to generate electricity in low- or no-wind conditions. The engine comprises a combustion chamber at the distal end of the blades, configured to rotate the blades as a result of combustion of a fuel in the combustion chamber. When the blades rotate, air in the blades is forced outward (to the combustion chamber at the distal end of the blade) due to centrifugal force. This pulls more air into the blades and compresses the air in the combustion chamber. The compressed air is heated and/or expanded by the combustion, then is expelled or ejected through a nozzle, which provides additional rotational thrust or force, similarly to the rotary engine disclosed in U.S. patent application Ser. No. 16/951,808. When configured as a horizontally-rotating engine, the blades may provide lift, offsetting or eliminating certain frictional forces in the engine due to gravity, and in some cases, effectively causing the blades, hub and axle or shaft to "float." When configured as a vertically-rotating engine, the fuel need not be burned or ignited in the presence of sufficient wind. The present engine is highly efficient, in the presence or absence of wind, and the centrifugal effect on the air in the blades maximizes the rotational thrust or force from heating the air in the combustion chambers and ejecting the heated air through the nozzles.

The invention, in its various aspects, will be explained in greater detail below with regard to exemplary embodiments.

An Exemplary Power Generating Apparatus

In one aspect, the present invention relates to an engine configured to convert rotary kinetic motion to a different form of energy, such as electricity. The engine comprises (a) a rotary hub enclosing a manifold, the manifold receiving a fuel supply conduit and having a plurality of outlets, each outlet being connected to one of a corresponding plurality of fuel distribution conduits, (b) a plurality of blades radially distributed around the hub, (c) an axle or shaft joined or fixed to the hub, configured to rotate with the hub, and (d) a generator operably connected to the axle or shaft, configured to convert a torque from the axle or shaft to electricity. Each of the blades has (i) a first end joined or fixed to the hub, (ii) a passage for air to flow to a second, distal end of the blade, (iii) one of the fuel distribution conduits therein or thereon, and (iv) a combustion chamber at the second, distal end of the blade. Each combustion chamber is configured to (I) receive fuel from a corresponding one of the fuel distribution conduits and air from the passage in the corresponding blade, (II) burn or detonate the fuel (thereby heating and/or expanding the air in the combustion chamber), and (III) direct the heated or expanded air and combustion gases in a direction that rotates the blades and the hub.

It is advantageous to design a windmill-based turbine power generation system with long blades that rotate around a vertical axis (a "horizontal engine," as defined herein). In such a design, there is no need to build a tall tower to support blades rotating around a horizontal axis (e.g., to be driven by the wind). In addition, the blades may be aerodynamically designed to provide at least some lift, to reduce or eliminate certain frictional forces due to the force of gravity on components of the engine such as the blades, the hub and the axle or shaft. In such embodiments, the blades and hub can effectively "float in the air" as a result of the lift provided by the blades during rotation. Thus, not only is the construction cost of the horizontal engine substantially reduced (e.g., relative to a conventional HWT), but also the operating and maintenance costs are lower.

In this aspect of the present invention, tubular or hollow arms may be used to replace the blades in a conventional HWT, and a combustion chamber and nozzle at the tip of each rotary arm is connected to provide power for rotation. Therefore, such embodiments do not rely on the interaction between the wind and the turbine blades. Consequently, it can be operated in all weather conditions, day and night.

FIGS. 4A-B show an exemplary embodiment of the present horizontal engine 300. FIG. 4A is a cross-sectional view of the engine 300 along the line D-D in the top-down or plan view of FIG. 4B. The engine 300 includes blades 310a-c, a hub 320 to which the blades 310a-c are attached, combustion chambers 315a-c (each at the end of the corresponding blade 310a-c distal from the hub 320), an axle or shaft 330 joined to the hub 320, a housing 350 comprising a roof or upper frame 352 and a plurality of supports 354, and an electricity generator 360. Together, the blades 310a-c and the hub 320 form a rotor. Each blade 310a-c includes an opening 312a-c through which air enters into a passage 380. Only opening 312a is shown in FIG. 4A, and only opening 312b and passage 380 are shown in FIG. 4B, but each blade includes both an opening 312 and a passage 380. The passage 380 carries the air to the combustion chamber 315 at the distal end of the corresponding blade 310.

The roof or upper frame 352 and the supports 354 support and stabilize the rotor and the axle or shaft 330 above the generator 360. The axle or shaft 330 extends between the hub 320 and the generator 360, through the roof or upper frame 352. The roof or upper frame 352 secures a first bearing 340 configured to seal the axle or shaft 330 and allow the axle or shaft 330 to rotate in position without lateral movement. The housing 350 is on a substantially flat or planar surface, such as flat ground. The blades 310a-c therefore rotate in a horizontal plane, resulting in a so-called "horizontal engine."

The engine 300 as shown in FIGS. 4A-B includes three blades 310a-c, but the engine 300 may include any positive integer number of blades 310 that provides another positive integer when 360 is divided by it (e.g., 2, 4, 5, 6, 8, 9, 10, 12, etc., which respectively give the positive integers 180, 90, 72, 60, 45, 40, 36 and 30 when 360 is divided by it).

The length of the blades 310a-c may be, e.g., in the range from 100 cm to 150 m or more, but the longer the blades 310a-c, the greater the centrifugal effect on the air and fuel, and the greater the effect of combustion of the fuel on rotation of the blades 310a-c and hub 320. For electricity generation, the length of the blades 310a-c may be in the range from 60 m to 150 m, and the hub may have an effective diameter of from 300 to 800 cm. More preferably, the blades 310a-c have a length of from 80 m to 150 m, and the hub has an effective diameter of from 400 to 800 cm.

The blades 310a-c and hub 320 may be made of materials including metals and metal alloys such as aluminum, steel, titanium, nichrome alloys, etc.; carbon, such as carbon fibers; fiberglass; plastics or polymer resins, as described herein; and combinations (e.g., laminates) thereof. The material(s) for the blades 310a-c may have a minimum elastic modulus (e.g., Young's modulus) of 2.5 GPa, and in some cases, of 10, 20, or 100 GPa, or any other value that is greater than 2.5 GPa. Thus, high-modulus plastics (e.g., having a minimum elastic modulus of 2.5 GPa) are also suitable for the blades 310a-c and the hub 320.

The blades 310a-c may have a shape designed to provide some measure of aerodynamic lift, similar to a propeller for an airplane. Such shapes are well-known in the aeronautical and wind turbine arts, and modifications to such shapes so that the lift provided by the blades 310a-c offsets the weight of the blades 310a-c, hub 320 and axle or shaft 330 at a predetermined rate of rotor rotation (which may be an optimum rotation rate for electricity generation) are known to one of skill in the art.

The combustion chambers 315a-c are configured to eject the heated compressed air and combustion gasses substantially tangentially to the circumference of a circular area swept by the blades 310a-c, thereby causing the rotor to rotate. The combustion chambers 315a-c may be made of or comprise one or more heat-tolerant and/or heat-compatible materials such as metals and metal alloys, ceramics (e.g., high-impact or shatterproof ceramics), or combinations (e.g., laminates) thereof.

The combustion chambers 315a-c may have a length of from 5 cm to 200 cm (or any value or range of values therein) and a diameter of from 2.5 cm to 60 cm (or any diameter or range of diameters therein), although the length and diameter of the combustion chambers 315a-c is generally greater than the width and thickness, respectively, of the tips of the blades 310a-c. Also, in general, each of the blades 310a-c are identical to each other (e.g., they have the same dimensions and comprise the same materials), and each of the combustion chambers 315a-c are identical to each other.

Each of the blades 310a-c may include an interface zone 319a-c between the bulk material of the blade 310 and the material of the combustion chamber 315. The blade 310 is constructed to be stiff (i.e., have a high modulus of elasticity, as described herein) and to be lightweight (i.e., have a low density or specific gravity), so it may preferentially comprise or consist essentially of fiberglass, one or more plastic or polymer resins, and/or a glass- or carbon-fiber-reinforced plastic or polymer resin. Consequently, the bulk of the blade 310 is not necessarily thermally conductive or thermally resistant. On the other hand, the combustion chamber 315 generally must be thermally resistant and preferably is thermally conductive (to dissipate excess heat), and therefore preferentially comprises or consists essentially of a material such as one or more metals, metal alloys and/or thermally-resistant ceramics. The interface zone 319 is where such thermally dissimilar materials are joined to each other, directly (e.g., by a thermally-compatible or expandable adhesive, bolt-and-nut connectors, tongue-in-groove joints, etc.) or indirectly by being joined to one or more mechanically rigid materials with intermediate thermal properties (e.g., having a thermal conductivity and/or coefficient of thermal expansion between those of the materials of the blade 310 and the combustion chamber 315).

Each of the blades 310a-c also has an opening 312a-c that provides air to the combustion chambers 315a-c through a corresponding passage 380. The openings 312a-c may have a height that is 25-90% of the thickness of the blades 310a-c at the locations of openings 312a-c (or any percentage or range of percentages therein), and a width that is 5-20% of the length of the blades 310a-c (or any percentage or range of percentages therein). Each passage 380 may independently have a height and a width that is 50-99% of the height and width of the blades 310a-c, respectively. In the horizontal engine, the passages 380 may have a length that is 70-95% of the length of the blades 310a-c.

The blades 310a-c are conventionally joined or connected to the hub 320, as is the axle or shaft 330. Referring to FIG. 4A, the hub 320 houses a manifold 325. The manifold 325 receives fuel from a fuel supply line or conduit 374 connected thereto, and distributes the fuel to a fuel distribution line or conduit 314a-c on or in each blade 310a-c. The fuel supply line or conduit 374 passes through an axial opening through the center of the axle or shaft 330. Since the manifold 325 rotates with the hub 320, but the fuel supply line or conduit 374 passing through or along the generator 360 does not, the fuel supply line or conduit 374 includes a bearing that either (i) connects the fuel supply line or conduit 374 to the manifold 325 or (ii) connects a non-rotating section of the fuel supply line or conduit 374 to a rotating section of the fuel supply line or conduit 374 (which is, in turn, connected to the manifold 325). The fuel distribution line or conduits 314a-c provide the fuel to the combustion chambers 315a-c for combustion or detonation therein.

For example, the hub 320 may independently have a height and a diameter from 10 cm to 10 m or any value or range of values therein. For electricity generation, larger values are preferred, such as a height of 2-8 m and a diameter of 3-10 m, although the invention is not limited by these values. Alternatively, the height and/or diameter of the hub 320 may be 1-20% of the length of the blades 310a-c (or any value or range of values therein), although the invention is not limited by these values.

The axle or shaft 330 extends through the roof or upper frame 352 of the housing and into the generator 360. A transmission, differential or gear box (not shown in FIGS. 4A-B) in the generator 360 receives torque from the axle or shaft 330 (which is, in effect, a low-speed axle or shaft) and converts the torque to higher-speed rotations of a second, high-speed axle or shaft (not shown) in the generator 360. The gear box is generally conventional. Thus, in some embodiments, the high-speed axle or shaft in the generator 360 may rotate at a rate that is m/n times the rate of rotation of the axle or shaft 330, where m is an integer $\geq 10$, n is an integer $\geq 1$, and m$\geq 10$*n. In fact, for electricity generation, m/n may be $\geq 20$, 40, 50, or any other integer >10.

The axle or shaft 330 may be cylindrical in shape, but is not limited to such a shape. For example, it may have a cross-section that is square, hexagonal, pentagonal, octagonal, etc. The axle or shaft 330 may have a diameter or width of from 2 cm to about 3 m, or any diameter or width (or range of diameters or widths) within this range, and a length of from about 50 cm to 10 m or more. The axle or shaft 330 may comprise a metal or metal alloy, such as aluminum, steel, titanium, etc., a ceramic such as boron carbide, boron nitride, alumina, zirconia, etc., a plastic such as a polycarbonate, a polyacrylate, a polymethacrylate, polyvinylchloride (PVC), an epoxy resin, or other organic polymer, copolymer or polymer blend having a tensile modulus of at least 2.4 or 2.5 GPa, and combinations (e.g., coated or layered variations) thereof, etc.

The housing 350 defined by the roof or upper frame 352 and the support(s) 354 may enclose the generator 360, as well as a fuel storage tank or vessel 370 and a fuel pump 372. In such embodiments, the support(s) 354 may comprise a plurality of walls, at least one of which includes a sealable opening such as a door or gate, and the roof or upper frame 352 comprises the roof. Alternatively, the support(s) 354 may comprise a single structure, such as a concrete or composite cylinder, frustum or ellipse surrounding the generator 360 the fuel storage tank or vessel 370 and the fuel pump 372. In other or further alternatives, the fuel storage tank or vessel 370 and (optionally) the fuel pump 372 may be outside the housing 350, in an external environment or in one or more separate housings or enclosures. In further embodiments, the support(s) 354 comprise a plurality of pillars or columns (e.g., of concrete, which may be steel-reinforced), and the roof or upper frame 352 comprises a frame.

The roof or upper frame 352 includes a bearing 340 through which the axle or shaft 330 passes (FIG. 4A). The bearing 340 fits tightly to the axle or shaft 330 and allows the axle or shaft 330 to rotate therein. The bearing 340 is secured tightly in place by the roof or upper frame 352. The housing 350 may also house or store a small battery, for example, to provide an electrical charge to the combustion chambers 315a-c to ignite the fuel therein.

The engine 300 works by first starting the rotation of the rotor. For example, rotation of the blades 310a-c and hub 320 may be initiated using a starter crank or a combustion cycle in the combustion chambers 315a-c. The air mass first absorbed naturally through the openings 312a-c into the intake section of the passages 380 in the blades 310a-c is pushed outward by centrifugal force and compressed as it travels through the passages 380. To facilitate this flow and compression, the passages 380 may comprise a long tube with a smooth interior surface. The cross-sectional area of the passages 380 become smaller the further away from the hub 320, and thus, the air in the passages 380 becomes more and more compressed (i.e., has a higher density) as it travels farther from the hub 320.

The compressed and/or pressurized air passes through a valve or gate 318a-c (FIG. 4B) before entering the combustion chamber 315a-c. The valve or gate 318a-c (FIGS. 7A-B) may comprise a steel plate attached by a hinge to an uppermost point in an opening in an internal wall in the passage 380. In some embodiments, the steel plate completely covers the opening in the internal wall and overlaps at least a little with the wall, so that it opens only in the downstream direction. In the absence of combustion or detonation in the combustion chambers 315a-c, such valves or gates 318a-c will typically be pushed open by centrifugal force acting on the air in the passage 380. A stopper or blocker may be installed or mounted on the interior surface of the passage 380 (e.g., along a lowermost interior surface) downstream from the interior wall, to allow the gate to open at most to a predetermined maximum amount (e.g., in the range of 20°-60° from vertical, such as about 30° from vertical).

The fuel (on the order of a microliter to a few ml, depending on the internal volume and configuration of the combustion chamber 315) is injected into the combustion chamber 315 and ignited. The fuel may be injected using a small pump (not shown, but located for example in the hub 320 adjacent to the manifold 325 [FIG. 4A], immediately upstream from the manifold 325 in the case of a single pump, or downstream from the manifold 325 in the case of a number of pumps equal to the number of combustion chambers 315). The explosion from the resulting combustion or detonation of the fuel heats and expands the compressed air in the combustion chamber 315 and forces/pushes the valve or gate 318 closed until the pressure in the combustion chamber 315 decreases to less than the pressure of the air in the passage 380 immediately upstream from the valve or gate 318. Thus, combustion in the combustion chambers 315 occurs in pulses.

The high-pressure and/or high-energy expanded air and the exhaust is thrust out of the combustion chambers 315a-c (e.g., through a nozzle 430; see FIG. 7B and the discussion thereof below), and the reaction force results in rotation of the blades 310a-c around the hub 320. After combustion, the pressure on the air in the passage 380 from centrifugal force pushes the valve or gate 318 open again, and the cycle (compressed air and fuel enter the combustion chamber 315, the fuel is ignited, the compressed air absorbs heat, expands and exits the combustion chamber 315) repeats. After a certain number of cycles (e.g., 1-5 in some cases), the combustion chamber 315 may become sufficiently hot that the fuel auto-ignites, and an externally-supplied charge for ignition is not necessary. In other cases, as the rate of rotor rotation increases, the rate of ignition and/or the number of combustion/detonation cycles per unit time may decrease as a target rotor rotation rate is approached and/or achieved.

The length of the blades 310a-c plays a pivotal role in electricity generation, because the torque provided to the generator 360 is equal or approximately equal to length of the blades 310a-c multiplied by the thrust force. This simple but powerful design/device can contribute to electrical power industry, as well as provide an engine/power for the transportation industry (such as for a helicopter).

Cross-sectional views of the tubular/hollow blades 310/310' are shown in FIGS. 5A-B. The cross-sections in FIGS. 5A-B are taken along line C-C in FIG. 4A. In FIG. 5A, the fuel distribution line or conduit 314 is on the exterior of the blade 310, along the lower external surface of the blade 310, near the edge of the blade 310 facing away from the direction of rotation. In FIG. 5B, the fuel distribution line or conduit 314 is in the interior of the blade 310', along the internal surface facing toward the direction of rotation. In both designs, the passage 380 takes up most of the interior space in the blades 310 and 310'. In an alternative approach, the passage 380 is the entire (or entire remaining) interior space of the blades 310 and 310', but flow of the air through the interior space of the blades 310 and 310' is generally more turbulent than through the passage 380, which may have a smooth, continuously-curved inner surface. The aerodynamic upper and lower external surfaces of the blades 310 also generate lift (e.g., an upward force), which reduces friction caused by the rotating hub 320 and axle/shaft 330 due to gravity (e.g., acting on the rotor). The engine 300 therefore becomes very efficient.

The linear speed at the tip of the blades 310 can reach the speed of sound (i.e., sonic speed), which can provide sufficient cooling for the combustion chambers 315. Furthermore, use of a strong and light-weight material, such as fiberglass, for the bulk of the blades 310 also increases the efficiency of the engine 300.

Figure 6:
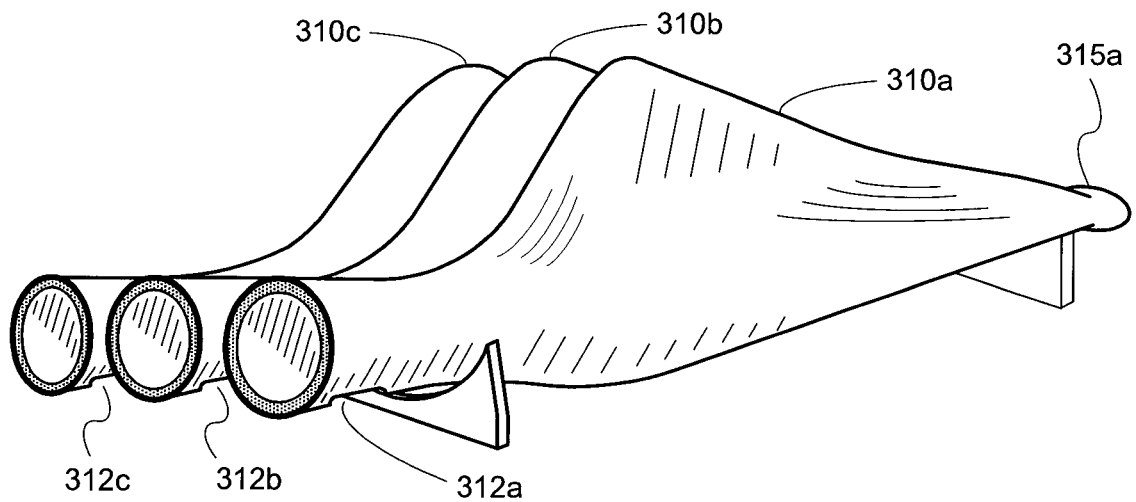
FIG. 6 shows a perspective view of the exterior of exemplary blades that are useful in the exemplary engines of FIGS. 4A-B and 8.

To reduce their weight, the blades 310 may have a hollow or substantially hollow interior, although one or more structures may be included in the hollow interior of the blades 310, such as the passage 380, the fuel distribution line or conduit 314, and/or an electrical line (e.g., wire) supplying an electrical charge (e.g., spark) to an igniter in the combustion chamber 315. FIG. 6 shows a perspective view of the blades 310a-c prior to assembly on or to the hub 320. The circular rim 311a-c of the blades 310a-c is secured to the hub 322 as shown in FIGS. 4A-B (e.g., by bolt-and-nut fasteners, one or more clamps, a sealant and/or gasket with at least some adhesive properties, etc.).

The length of the blades 310a-c plays a very important role, because centrifugal force (e.g., on the air in the passage 380) is directly proportional to the length of the blades 310a-c when the rotor rotates. Therefore, at the tips of the blades 310a-c, air inside the blades 310a-c (e.g., in the passage 380) is under great pressure because of the centrifugal force when the blades 310a-c are sufficiently long (e.g., at least 15 m, 20 m, or more). The longer the blade, the denser the air at the valve 318 and/or the inlet to the combustion chamber 315. To take advantage of the naturally-occurring compressed air supply, an alternative approach (without the combustion chamber) simply adds a nozzle with an approximately 90° bend (e.g., an opening at the distal end of the blade 310, along the edge facing away from the direction of rotation). The compressed air is thrust out from the nozzle in the direction opposite from rotor rotation, as shown in FIG. 4B. The reaction force of the compressed air exiting (leaving) the nozzle increases the rotor speed relative to an otherwise identical rotor without the nozzle.

Figure 7A:
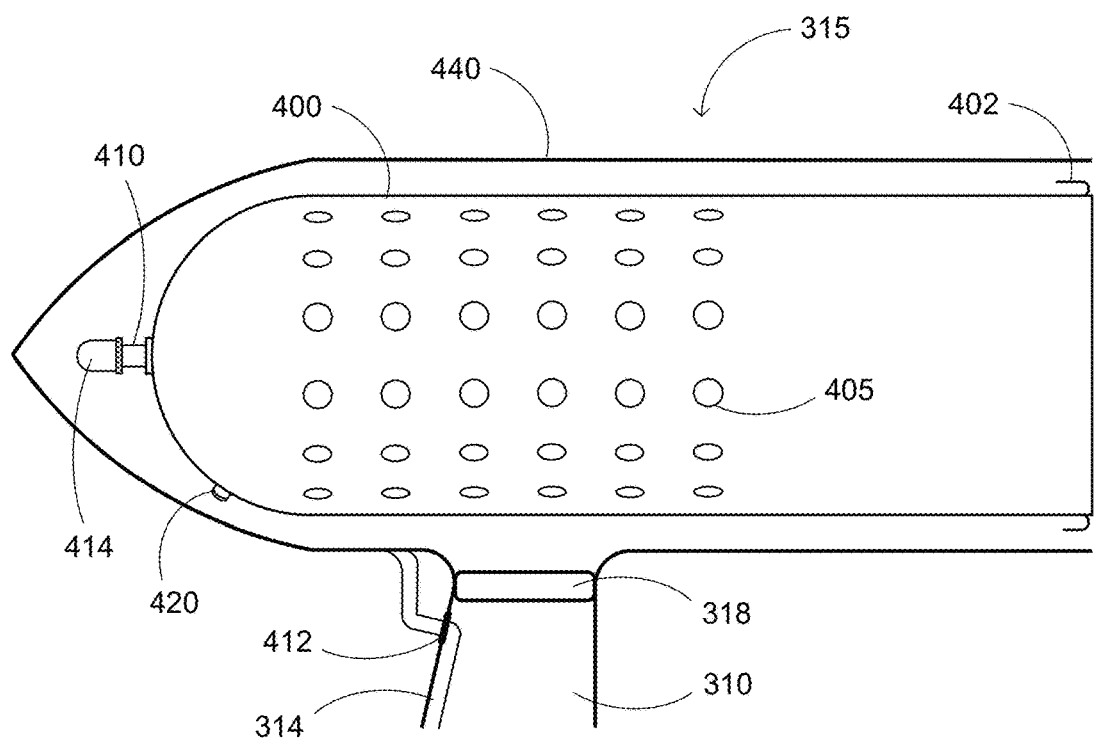
FIGS. 7A-B show top-down views of an exemplary combustion chamber that is useful in the exemplary engine of FIGS. 4A-B.
Figure 7B:
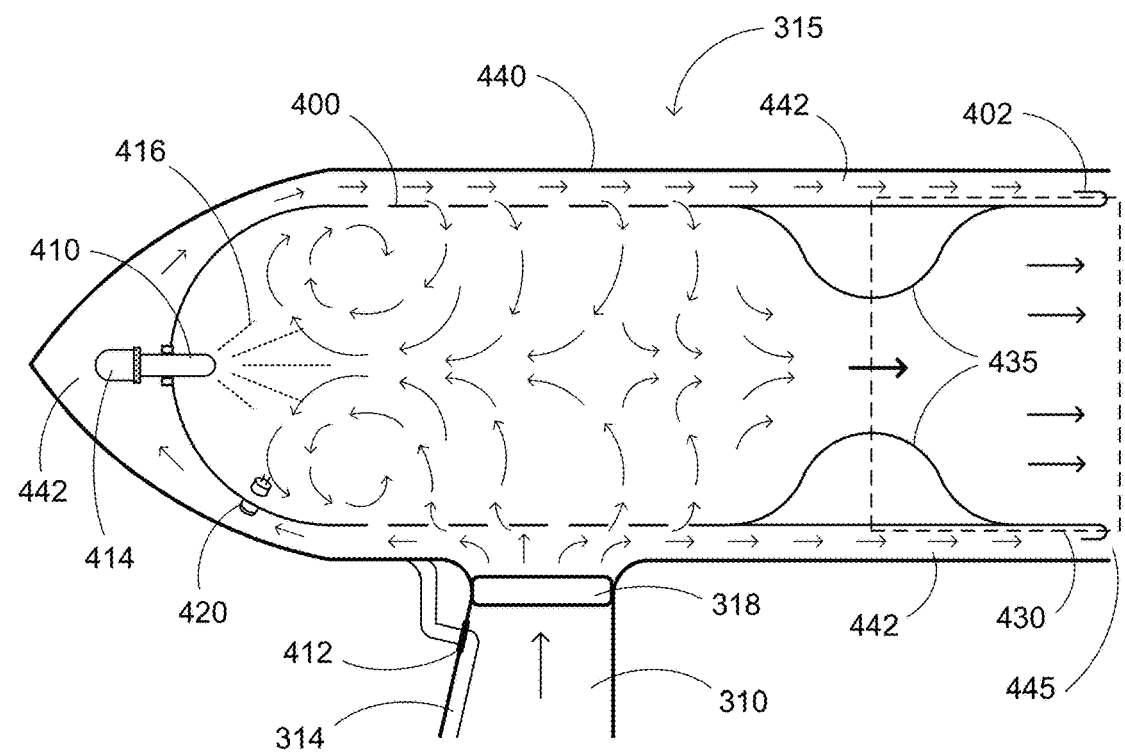

In the design shown in FIGS. 4A-B, a relatively small combustion chamber 315 with a nozzle at its outlet and a fuel supply are added at the end of the blade 310 to fully utilize the compressed air for the combustion chamber and nozzle to generate more thrust. FIGS. 7A-B show plan views of an exemplary combustion chamber 315 useful in the engines 300 and 500 of FIGS. 4A-B and 8. FIG. 7A shows the combustion chamber 315 with an upper half of the outer wall or casing 440 removed, revealing the inner wall 400. The inner wall 400 may be mounted or affixed to the inner surface of the outer casing or housing 440 of the combustion chamber 315 by welding (directly or through a plurality of extension pieces [not shown], such as short steel rods or blocks), bolt-and-nut fasteners, etc. FIG. 7B shows a cross-section through the mid-plane of the combustion chamber 315, in which the arrows show air flow through the combustion chamber 315.

The fuel distribution line or conduit 314 and an ignition line (not shown) for the igniter 420 are imbedded or fixed within the body or hollow interior of the blade 310. Centrifugal force compresses the air flowing to the valve 318, opening the valve 318 and flowing into the combustion chamber 315. A small amount of fuel (as described herein) is supplied into the combustion chamber 315 through the fuel distribution line or conduit 314 and an elbow connector 414 to a fuel injector 410. The fuel injector 410 may comprise an atomizer, nebulizer or other similar device configured to generate a fine mist 416 of the fuel inside the inner wall 400 of the combustion chamber 315 (see FIG. 7B), which facilitates vaporization and subsequent combustion/detonation of the fuel. Referring back to FIG. 7A, the fuel distribution line or conduit 314 passes through an opening and gasket 412 in the wall of the blade 310. The portion of the fuel distribution line or conduit 314 outside of the blade 310 may be made of steel, a non-porous (but high-strength) ceramic, or other heat-tolerant material, as it may contact (e.g., run along) the exterior surface of the combustion chamber 315 to or nearly to the nose of the combustion chamber 315. Combustion of the fuel in the combustion chamber 315 enhances wind turbine power production (see, e.g., the engine 500 of FIG. 8 and the discussion thereof below), especially in low- or no-wind conditions.

Torque is the product of the force of the rotor and the radius of the rotor, which is directly related to the length of the blades 310. When the diameter of the rotor exceeds 100 meters, a small amount of thrust from the combustion chambers 315 generates a significant amount of torque. A small amount of fuel combustion, when combined with the highly compressed air passing through and being heated by the combustion chambers 315, generates significantly more torque than without the combustion chambers.

Referring to FIG. 7A, the inner wall 400 of the combustion chamber 315 contains a number of openings 405 to allow some, but not all, of the compressed air to enter an inner chamber in which the fuel is burned or detonated. FIG. 7A shows six rows of twelve circular openings 405 around the inner wall 405, but the openings 405 may have essentially any size or shape, and may be present in substantially any number. It is within the ability of one skilled in the art to design an array of openings 405 to provide a desired or predetermined amount of thrust (within a certain tolerance) under a set of predefined conditions, such as, e.g., type and amount of fuel, dimensions of the inner wall 400 and inner chamber therein, length and cross-sectional area of the blades 310, etc.

FIG. 7B shows air flow in the combustion chamber 315, from the valve 318, through and around the inner wall 400, and out from the nozzle 430 and the outlet 445 of the combustion chamber 315. Air passing around the outside of the inner wall 400 in the conical and/or cylindrical channel 442 absorbs heat from the inner wall 400 during and after combustion, thereby expanding (and providing thrust), while at the same time cooling the inner wall 400 and the combustion chamber 315. The inner wall 400 may include a flange, blocker or shield 402 at the outlet 445 of the combustion chamber 315, configured to block some of the heated air in the channel 442 from exiting the combustion chamber 315 through the outlet 445, rather than through the nozzle 430. The flange, blocker or shield 402 may divert some of the heated air through the openings 405 in the inner wall 400, where it may be heated more efficiently in the inner chamber inside the inner wall 400. The flange, blocker or shield 402 may have a width or thickness (as measured along the width or radius of the outer casing 440) that is 25-90% of the difference between the widths or diameters of the inner wall 400 and the outer casing 440, or any percentage or range of percentages therein, although the invention is not limited to such values. It is within the level of ordinary skill in the art to determine appropriate dimensions for the inner wall 400, the channel 442, and (when present) the constriction 435 and/or the flange, blocker or shield 402 to provide predetermined levels or amounts of thrust (e.g., from the gases exiting the nozzle 430) and cooling (e.g., by the air passing through the channel 442).

The combustion chamber 315 and/or nozzle 430 may further include a constriction 435, configured to increase the force with which the heated air and combustion gases exit the combustion chamber 315. The constriction 435 may have a width, radius or diameter that is 25-90% of the width, radius or diameter of the inner chamber (i.e., the interior of the inner wall 400), or any percentage or range of percentages therein, although the invention is not limited to such values.

A relatively long blade is advantages to the present engine. As shown in FIG. 4B, the nozzle or outlet of the combustion chamber 315 points substantially along a tangent to the circumference of a circle defined by rotation of the outermost part of the rotor, in the direction opposite to the rotation of the rotor. A reaction force (e.g., of the combustion chamber 315 and blade 310 to combustion of fuel in the combustion chamber 315) in the same direction of the rotor rotation assists rotation of the wind turbine, and increases the rotation speed. When the wind turbine rotates at a faster rate, the centrifugal force on the air in the passage 380 increases due to the higher rotation speed, and as a result, the air in the passage 380 becomes more compressed (i.e., has a higher pressure), which generates more thrust and an even higher rotation speed, etc. This "self-amplifying"

effect results in a process for electrical power generation that has a greater efficiency than in the absence of the combustion chambers 315.

Of course, in the presence of a sufficiently strong wind (e.g., 3-5 m/s or greater), there is no need for fuel combustion to drive rotation of the blades 310. Thus, in some further embodiments, the engine 300 may further include a door or gate (not shown) that closes the openings 312 in the blades 310 in the presence of wind at or above a threshold speed (e.g., ≥3-5 m/s). Wind is generally not an energy source that is constant or reliable, however. As a result, by controlling fuel consumption in the engine 300, the rotation speed of the blades 310 may be maintained at a minimum or optimum value for electricity generation, and the electricity output from the generator 360 can be controlled and/or regulated. Therefore, regulating/controlling the fuel supply according to the wind speed and/or variations therein can increase and/or stabilize the power output from the generator 360.

The valve 318 between the passage 380 and the combustion chamber 315 may also be an electrically-controlled valve, configured to receive signals to open and close from the controller. A commercially-available software system can be adapted and/or modified for use in the controller, to control operations of various electrical components of the engine 300.

An Exemplary Vertically-Rotating Engine

Figure 1B:
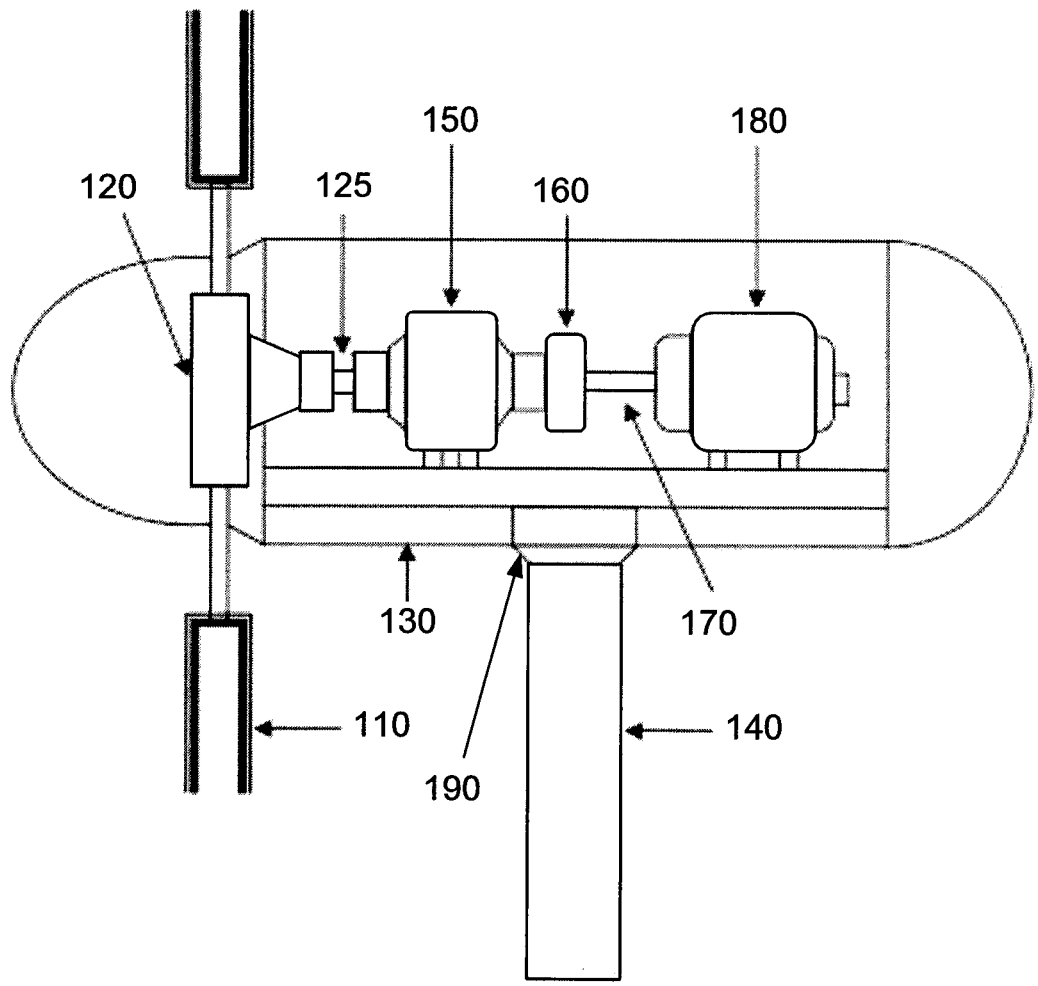
Figure 3:
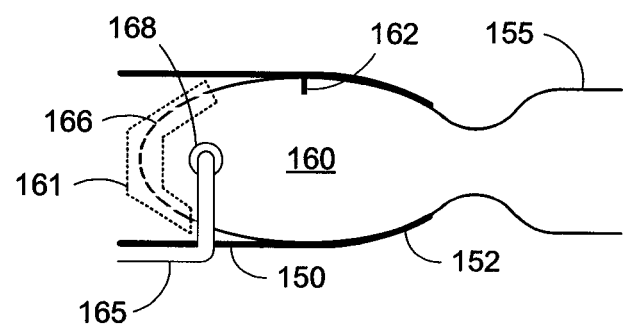
FIG. 3 is a plan view of a combustion chamber that is useful in the exemplary engine of FIGS. 2A-B.
Figure 2A:
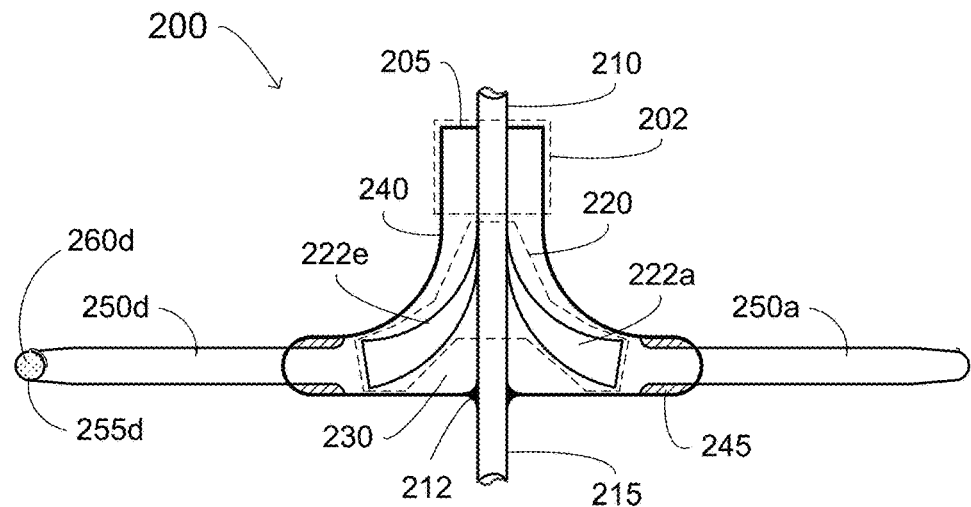
FIGS. 2A-B are diagrams showing an engine including combustion chambers at ends of rotary arms according to U.S. patent application Ser. No. 16/951,808.
Figure 2B:
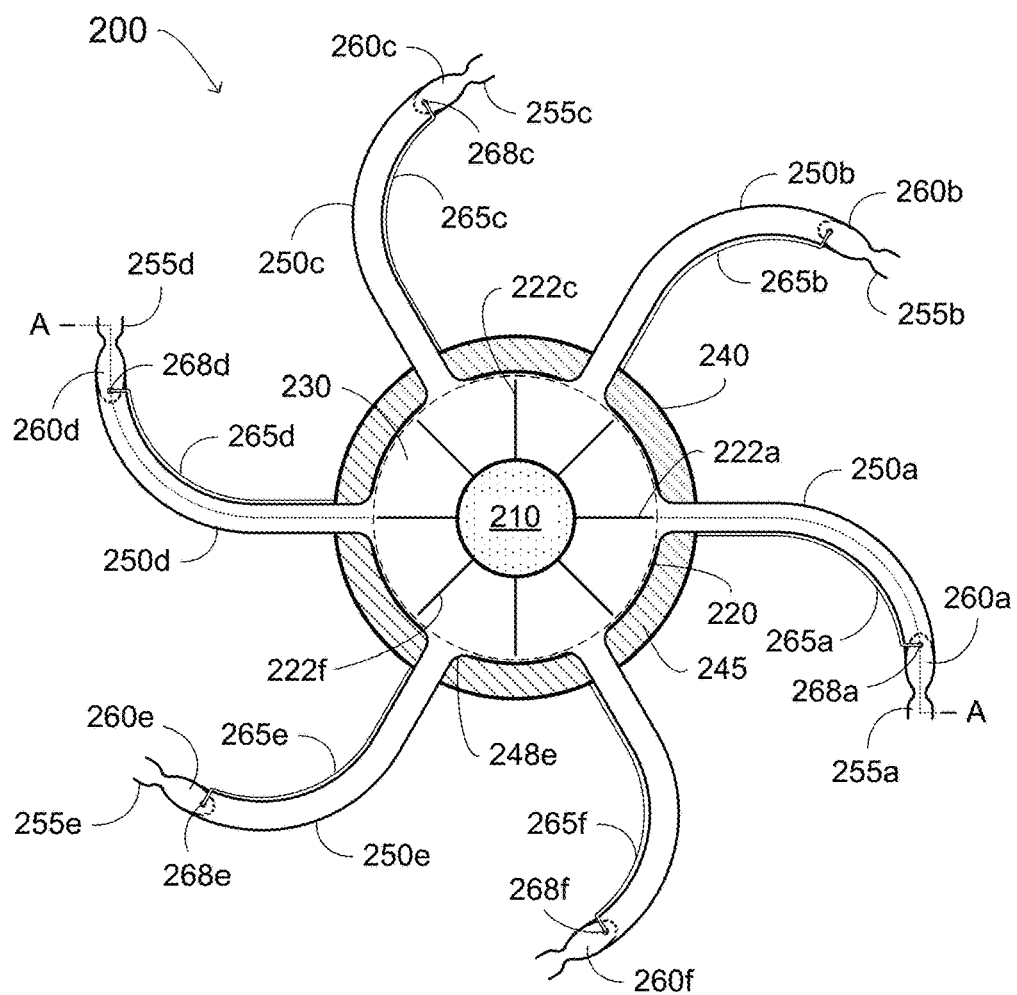
Figure 8:
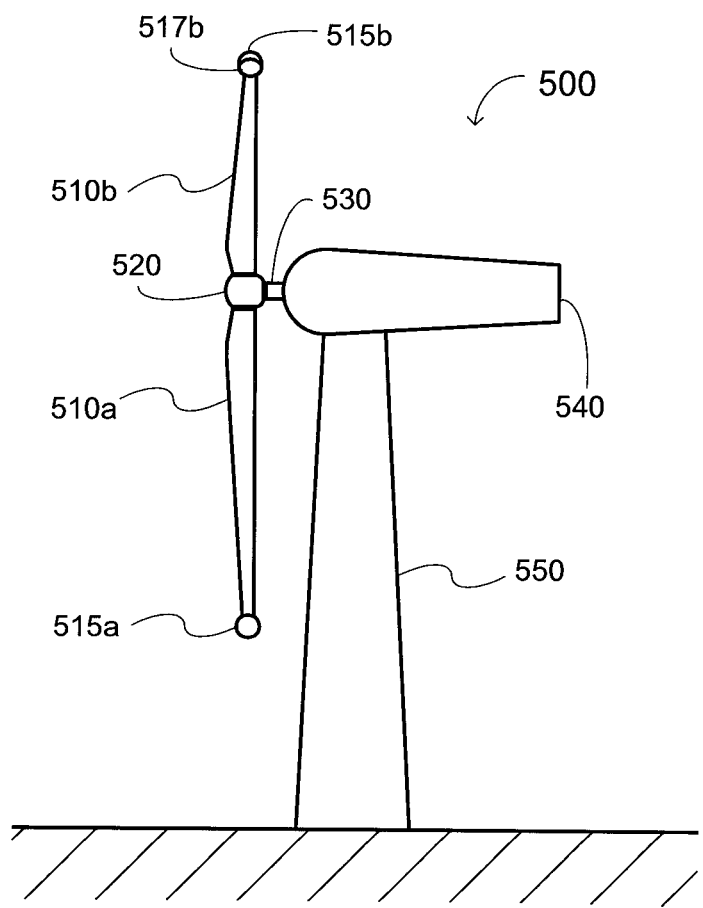
FIG. 8 shows an exemplary vertically-rotating engine according to one or more embodiments of the present invention.

FIG. 8 shows an exemplary engine (e.g., horizontal wind turbine) 500, comprising many of the components in the exemplary engine 300 in FIGS. 4A-B and a tower to support the rotor as it rotates in a vertical plane (e.g., in response to a wind having a minimum threshold speed, as discussed herein). In general, the wind turbine 500 includes a plurality of blades 510a-b, a plurality of combustion chambers 515a-b at a distal end of the blades 510a-b, a hub 520 to which a near end of each of the blades 510a-b is connected, an axle or shaft 530 that rotates with the hub 520, a nacelle 540, and a tower 550. One or more blades 510 may be hidden behind a blade 510a-b and/or the hub 520, and may not be visible in FIG. 8. Each combustion chamber also includes a nozzle 517 (only nozzle 517b is shown). The nacelle 540 is similar or identical to the nacelle 130 in FIGS. 1A-B, and may include the same or similar components as those shown and described with regard to FIG. 1B. The tower 550 is outdoors, on the ground or on a platform on the sea. The platform at sea may be floating or anchored on the sea bed.

The wind turbine 500 operates similarly to the engine 300 in FIGS. 4A-B, except that the blades 510, hub 520 and axles/shaft 530 rotate around a horizontal axis, and when the wind is at or above a minimum threshold speed (e.g., 3-5 m/s, or any value in this range), the wind turbine 500 can operate without burning or combusting fuel in the combustion chambers 515. The wind turbine 500 may further include a relatively small battery, a fuel storage tank or vessel, one or more pumps, and/or a relatively large battery. The small battery may be housed within the tower 550, and may be configured to provide an electrical charge to the igniters in the combustion chambers 515. The fuel storage tank or vessel stores the fuel for the combustion chambers 515, and may be housed within the tower 550 or in another shelter near the tower 550. Alternatively, the fuel storage tank or vessel may be a stand-alone structure outside the tower 550. Similar to the fuel pump 372 discussed with regard to FIG. 4A, the pump(s) in/for the wind turbine 500 pump fuel from the fuel storage tank or vessel to the fuel injectors in the combustion chambers 515. There may be a series of pumps from the fuel storage tank or vessel to the combustion chambers 515, each pumping the fuel to a successively higher pump in the tower 550. The relatively large battery stores electrical charge generated by the generator in the nacelle 540. Typically, the relatively large battery is not housed within the tower 550, but it may be, depending on the size of the tower 550, the size of the relatively large battery, and the safety considerations applied to the wind turbine 500.

Figure 9:
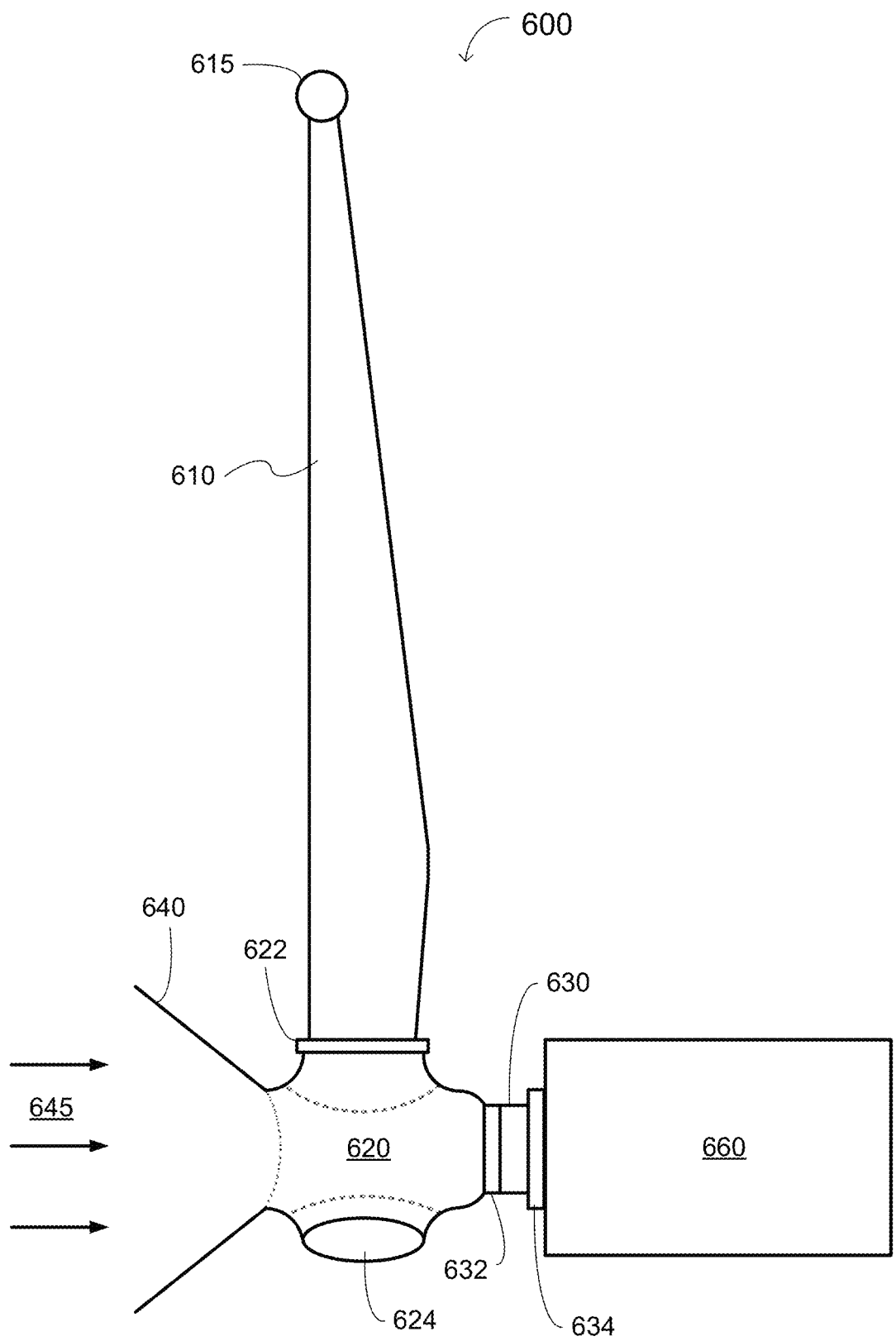
FIG. 9 shows exemplary components that are useful in the exemplary engine of FIG. 8, according to one or more embodiments of the present invention.

As shown in FIG. 9, the hub 620 of the rotor can be modified to add an air inlet 640. The hub 620 has substantially clear pathways therein to the passages or other hollow channels in the blades 610. When the wind turbine is in operation, air 645 enters through the inlet 640 and flows through the hub 620 and into the passages in the blades 610. When the blades 610 rotate, the air accelerates toward the distal end of the blades 610 as a result of centrifugal force, as described herein. In addition, since the size (e.g., cross-sectional area) of the passage in the blades 610 gets smaller toward the distal end, the air compresses even further. As results, the blades 610 act as compressors.

As with the engine 300 of FIGS. 4A-B, during operation of the wind turbine 500 of FIG. 8, the compressed gas from the blade 510 to the combustion chamber 515 (optionally through a valve or gate), then is mixed or combined with the fuel in the combustion chamber 515, where the fuel is ignited to heat the compressed, pressurized gas, causing the compressed, pressurized gas to rapidly expand as it exits the nozzle 517. As a result, burning a relatively small amount of fuel can cause a relatively large increase in the rotation rate of the blades 510 and hub 520, as compared to the rotation rate of the blades and hub in the absence of the combustion chambers 515.

In most applications, the blades (e.g., blades 310 or blades 510) may have a shape like a propeller, which may provide thrust and enable use in aeronautic and/or aviation applications. Such a blade-and-hub design may be useful in a helicopter, airplane, or drone, for example.

The combustion chambers 515 may be sufficiently cooled simply by rotating in the ambient air. However, if necessary or desired, the combustion chambers 515 may be cooled by coils (e.g., metal tubes or conduits) around the combustion chambers 515 that carry or transport water. When the water inside the coil around a particular chamber becomes sufficiently hot to vaporize, the steam/water vapor can then be directed to the exhaust from the corresponding nozzle 517 to add more mass to the thrust from the heated gas exiting the nozzle 517.

Many components of the present engine may be constructed using light-weight and low-cost materials, such as fiberglass, carbon fiber, recycled plastics and the like. Even those components that require metal or another thermally-conductive material can be made using relatively light-weight and low-cost materials, such as aluminum or an alloy thereof (e.g., with up to 10% by weight of Cu, up to 0.5% by weight of vanadium and/or zirconium, up to 10% by weight of Mg and/or Ce, up to 20% by weight of Si, combinations thereof, etc.).

Exemplary Vehicles

Figure 10:
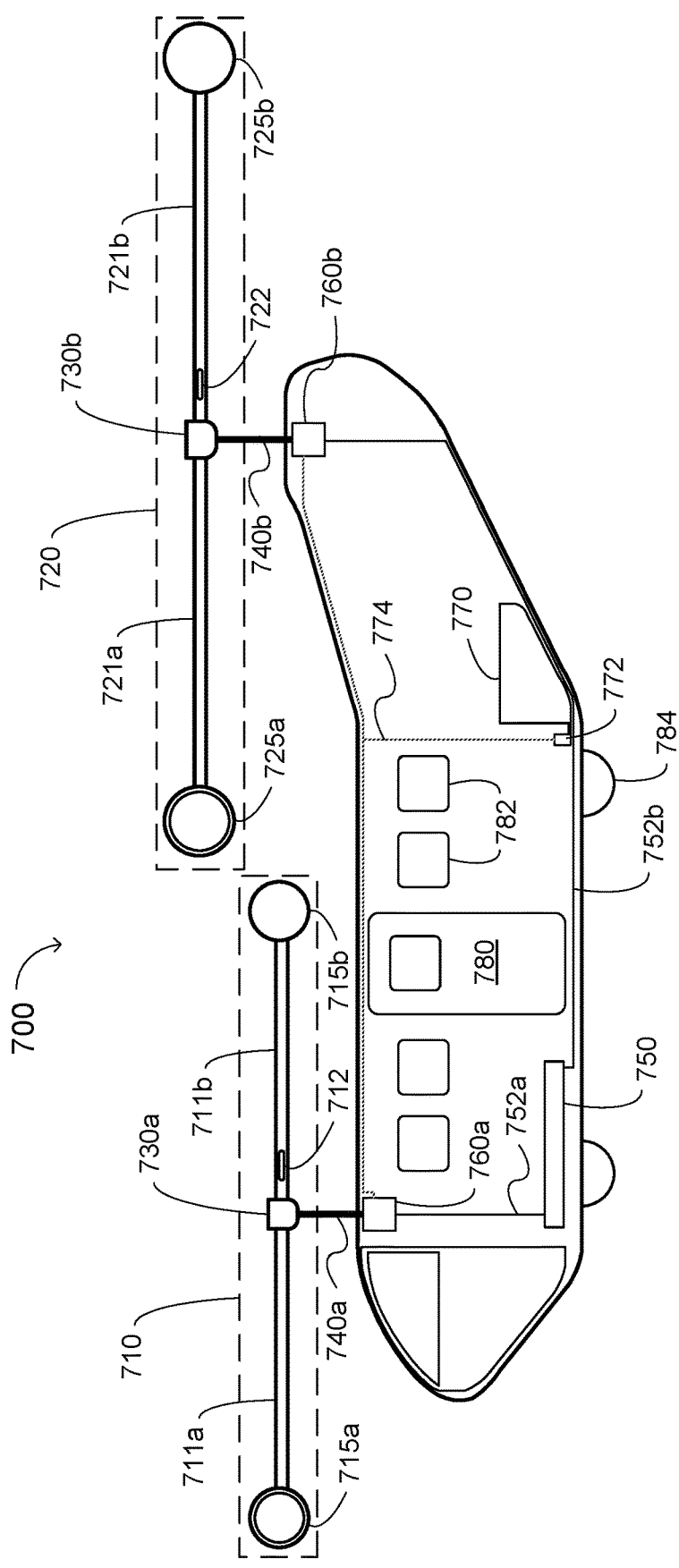
FIG. 10 shows an exemplary vehicle including exemplary horizontally-rotating engines according to one or more embodiments of the present invention.

The present invention further relates to a vehicle such as an aircraft (e.g., an airplane, helicopter, or drone) or a flying automobile. FIG. 10 shows an exemplary helicopter or flying automobile 700. The helicopter/flying automobile 700 comprises first and second rotary engines 710 and 720, configured to provide lift for flight of the vehicle 700 and to generate electricity. The first engine 710 includes a plurality of blades 711a-b, an opening 712 in each blade 711a-b, a plurality of combustion chambers 715a-b, a hub 730a, a shaft or axle 740a, and a generator 760a. The second engine 720 includes a plurality of blades 721a-b, an opening 722 in each blade 721a-b, a plurality of combustion chambers 725a-b, a hub 730b, a shaft or axle 740b, and a generator 760b. Although only two blades 711-721 are shown in each engine 710-720, the engines 710 and 720 may include 3 or more blades (e.g., 4 blades). The openings 712 and 722 in only blades 711b and 721b are shown.

Similar to the engine 300 in FIGS. 4A-B, fuel in the fuel tank 770 is pumped by a pump 772 to the engines 710 and 720 through a fuel supply conduit 774. The fuel conduit 774 enters a corresponding housing for each generator 760a-b, then it passes through the center of the shafts/axles 740a-b to a manifold (not shown) in each hub 730a-b. The fuel is distributed to each combustion chamber 715a-b and 725a-b from the manifold through a fuel distribution line or conduit (not shown). Additional pumps or other fuel control mechanisms (e.g., a valve) may pump or otherwise control the flow of the fuel from the hub 730a-b to the combustion chambers 715a-b and 725a-b. The fuel is then detonated or burned in the combustion chambers 715a-b and 725a-b to cause the rotors in each engine 710 and 720 to rotate. The resulting torque on each shaft/axle 740a-b generates electricity in the corresponding generators 760a-b. The electricity is transmitted through electrically-conductive wires or cables 752a-b to a battery 750 for storage.

The electricity in the battery 750 can be used to operate electronic equipment in the vehicle 700 (e.g., during flight) and to propel the vehicle 700 when it is on the ground (i.e., not flying). Thus, the vehicle 700 may further comprise a plurality of (e.g., three, four or more) wheels 784, one or more doors 780, and a plurality of windows 782. When the vehicle 700 is on the ground, a brake or other rotation-stopping mechanism can lock the hubs 730a-b and blades 711-721 in place, and the pump 772 and any other fuel supply mechanism(s) may be turned off or disabled.

Figure 11:
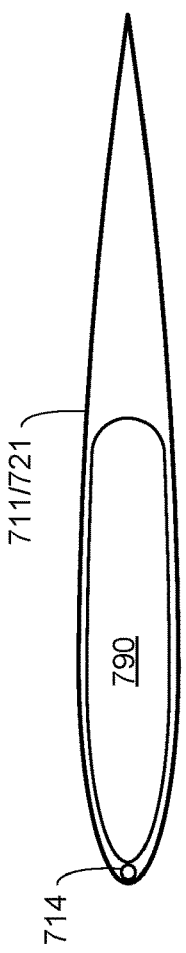
FIG. 11 shows a cross-section of an exemplary blade for the vehicle of FIG. 10, according to an embodiment of the present invention

FIG. 11 shows a cross-section of an exemplary blade 711 or 721. The cross-section is between the opening 712 or 722 and the valve or gate (not shown in FIG. 10) at the distal end of the blade 711/721. As shown in FIG. 11, a passage 790 for air from the opening 712 or 722 to the combustion chamber 715 or 725 extends along the length of the blade 711 or 721. The passage 790 may occupy 50%, 60%, 70% or more of the interior of the blade 711 or 721. A fuel distribution conduit 714 is inside the shell of the blade 711 or 721, but the fuel distribution conduit 714 may also be secured to the outside surface of the blade 711 or 721, similar to the fuel distribution conduit 314 in FIG. 5A.

Exemplary Methods

The present invention further relates to methods of generating electricity and propelling a vehicle such as an aircraft (e.g., an airplane, helicopter, or drone). In general, the method of generating electricity comprises igniting, burning or detonating a fuel in a plurality of combustion chambers, each at a distal end of a corresponding blade connected to and radially distributed around a rotary hub; expelling (i) air heated or expanded in the combustion chambers and (ii) combustion gases from the combustion chambers in a direction that rotates the blades and the hub; flowing the air through a passage in each of the blades to the combustion chambers; distributing the fuel from a manifold in the hub to the combustion chambers through a corresponding plurality of fuel distribution conduits in or on the corresponding blades; rotating an axle or shaft joined or fixed to the hub to generate a torque; and converting the torque to electricity using a generator. Generally, the number of combustion chambers, the number of blades and the number of fuel distribution conduits is the same. The method of propelling a vehicle is essentially the same as the method of generating electricity, except that the blades and hub are rotated at a rate sufficiently high to propel the vehicle, instead of converting the torque to electricity (although some or all of the torque can be converted to electricity, e.g., to operate one or more electrical devices or systems in the vehicle). Furthermore, in practice, the methods are performed continuously and/or in cycles, so the initial and final steps (and even the sequence of steps itself) is not particularly critical.

Figure 12:
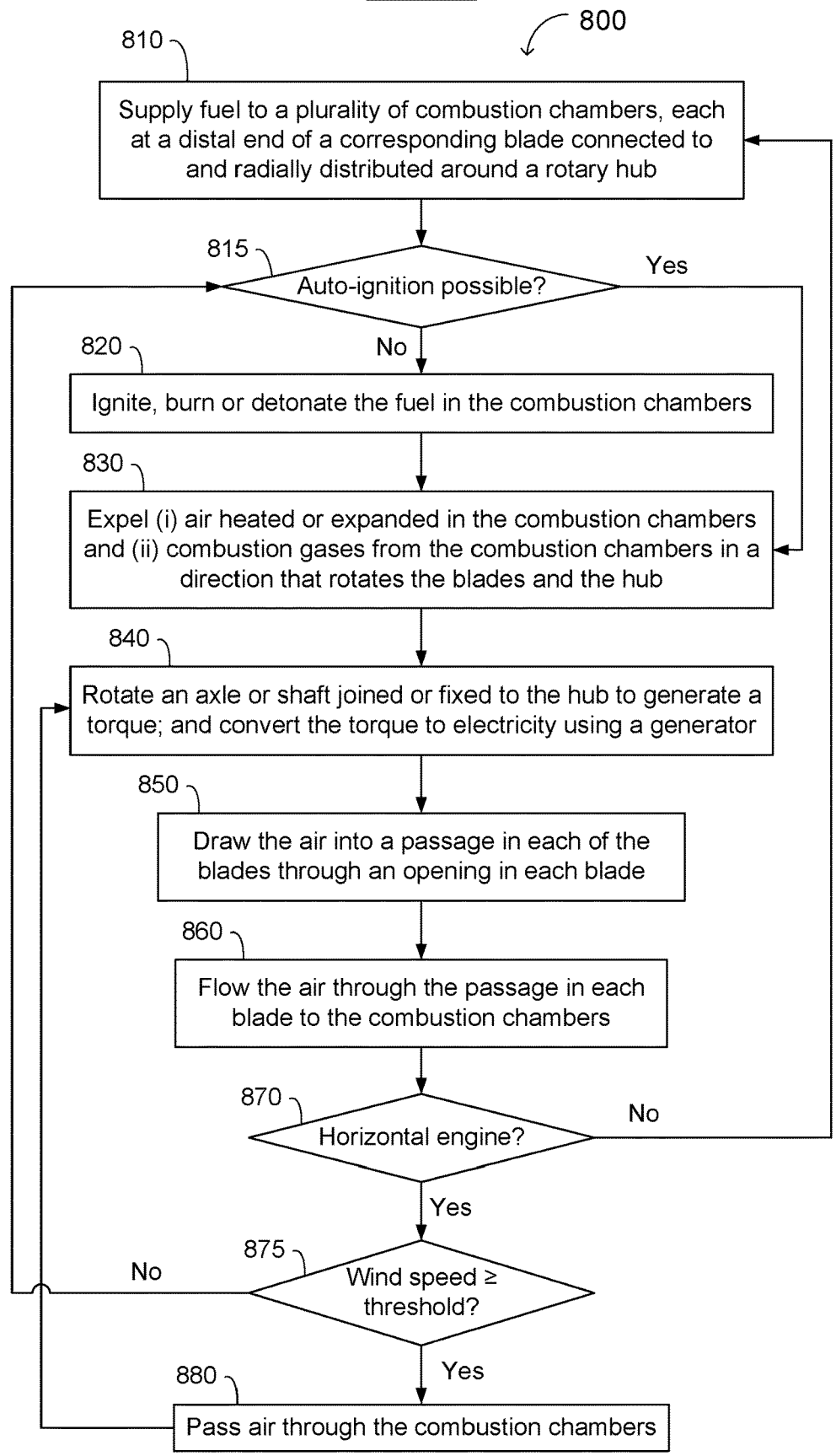
FIG. 12 shows a flow chart for an exemplary method of generating electricity in accordance with embodiments of the present invention.

FIG. 12 shows a flow chart 800 for an exemplary method of generating electricity in accordance with embodiments of the present invention. At 810, a fuel, such as a flammable hydrocarbon or alcohol (e.g., a gas such as methane, propane, butane, hydrogen, etc., a liquid such as methanol, ethanol, butanol, gasoline, diesel fuel, biodiesel, kerosene, etc., and combinations thereof) is distributed to a plurality of combustion chambers, each at a distal end of a corresponding blade connected to and radially distributed around a rotary hub. The fuel is distributed from a manifold in the hub to the combustion chambers through a fuel distribution conduit in or on each of the blades. In many embodiments, the method further comprises supplying the fuel to the manifold through a fuel supply conduit. For example, the method may further comprise pumping the fuel from a fuel storage tank or vessel as described herein into the fuel supply conduit (which is in fluid communication with the manifold) and/or storing the fuel in the fuel storage tank or vessel.

At 815, it is determined whether the fuel can be automatically burned or detonated. For example, if the combustion chambers are sufficiently hot to auto-ignite the fuel, then auto-ignition (automatic burning or detonation of the fuel in the combustion chambers) is possible. When auto-ignition of the fuel is possible, the method goes to 830. When auto-ignition is not possible (for example, at the outset of the method, during the first few cycles of the method, etc.), the method goes to 820.

At 820, the method ignites, burns or detonates the fuel in the combustion chambers. For example, the method may comprise igniting the fuel in the combustion chambers using a corresponding plurality of igniters, and optionally, the method may further comprise providing an electrical charge to each of the igniters. The method may also further comprise injecting the fuel into the combustion chambers from the corresponding fuel distribution conduits prior to ignition, combustion or detonation of the fuel. In general, each combustion chamber may have one igniter, such as a spark plug, an arc generator, or other ignition source. In some embodiments, after a number of cycles of ignition-initiated combustion or detonation (e.g., 1-10 cycles), the combustion chambers may retain sufficient heat to enable automatic ignition, combustion or detonation ("auto-combustion") of the fuel upon injection of a threshold amount of vaporized fuel in the presence of the compressed air in the combustion chamber.

At 830, the method comprises expelling (i) air heated or expanded in the combustion chambers and (ii) combustion gases from the combustion chambers in a direction that rotates the blades and the hub. For example, the heated or expanded air and combustion gases may be directed through a nozzle at the end of each combustion chamber (e.g., the end opposite from the end of the combustion chamber at which the fuel is injected and/or the nose of the combustion chamber) in a direction (i) tangential or substantially tangential to a circle defined by rotational movement of the combustion chamber or (ii) perpendicular or substantially perpendicular to a central axis of the corresponding blade. Typically, each nozzle has a maximum outer diameter that is equal to or less than a maximum outer diameter of the combustion chamber. In some embodiments, to generate greater force from the fuel combustion/detonation, each nozzle may comprise a constriction between the corresponding combustion chamber and an outlet of the nozzle, as described herein.

At 840, the method comprises rotating an axle or shaft joined or fixed to the hub to generate a torque, and converting the torque to electricity using a generator. In some embodiments (e.g., using the "horizontal engine"), the blades rotate in a vertical plane. In other embodiments (e.g., using the "vertical engine"), the blades rotate in a horizontal plane. In methods using either the horizontal engine or the vertical engine, the method may further comprise transferring the torque from the axle or shaft to a high-speed shaft using a transmission, differential and/or gear box. In such embodiments, the high-speed shaft rotates at a faster rate than that of the axle or shaft. For example, the high-speed shaft may rotate at a rate that is m/n times the rotation rate of the lower axle or shaft, where m is an integer $\geq 2$ (e.g., 3-100 or any value or range of values therein, such as 5-50, 10-25, etc.), and n is an integer $\geq 1$ (e.g., 1-15 or any value or range of values therein). In some cases, m is not divisible by n, and n may be a prime number.

The method may also further comprise storing the electricity from the generator in a battery. The battery may be housed in the same enclosure as the generator, or in a different enclosure. Thus, the method may further comprise carrying the electricity generated by the generator to the battery with an electrical cable. Alternatively or additionally, the method may further comprise transferring the electricity to an electrical grid using an inverter or converter.

In the method of propelling a vehicle, the torque from rotation of the axle or shaft may be transferred to a gear (in turn coupled to yet another apparatus, such as an axle driving a belt, wheel, roller, etc.), an engine, a cam or camshaft, etc. In one variation, the torque is transferred in a differential that receives the torque from the axle or shaft and transfers it to another axle or shaft, as is known in the art.

In some embodiments (e.g., using the vertical engine), the method further comprising supporting and/or stabilizing the axle or shaft with a bearing in a roof or upper frame of a housing configured to house and/or isolate the generator. In such embodiments, the housing may further include a plurality of supports that support the roof or upper frame above the generator. Alternatively (e.g., when using the horizontal engine), the method may further comprise supporting the rotary hub, the blades, and the axle or shaft with a tower, as described herein.

At 850, the method comprises drawing the air into a passage in each of the blades through an opening in each blade. In some embodiments (e.g., using the vertical engine), the opening is on a side of each blade facing the direction of rotation of the blades. In other embodiments (e.g., using the horizontal engine), the opening is in the end of the blade that is attached to the hub, in which case the method may further comprise drawing the air through an opening in the hub, the hub having a plurality of pathways therein in fluid communication with the openings in the blades.

As for the present engines, the method may use x blades, where x is a positive integer by which 360 can be divided to give an integer or a regular fraction. Thus, although the method often uses at least three blades, it can also use two blades, or four or more blades. When the method uses (or engine includes) four or more blades and x is an integer that can be divided by another integer to give a third integer, the combustion chambers (the number of which is the third integer and which must be at least two) are also evenly distributed around the hub. However, the presence of four or more blades in the engine may generate some turbulence and/or aerodynamic interference. In the present method, as for present engine, each of the blades may have a length of from 1 to 150 m, and the hub may have a diameter of from 10 cm to 10 m.

At 860, the method comprises flowing the air through a passage in each of the blades to the combustion chambers, as described herein. In many cases (e.g., when using the vertical engine), the method then returns to 810, supplying the fuel to the combustion chambers, and the cycle repeats itself until terminated. However, when using the horizontal engine (see 870), and the wind speed is greater than or equal to a predetermined threshold (e.g., 3-5 m/s) at 875, the method may simply pass the air in the passages through the combustion chambers without burning any fuel, and return to 840 (rotate the axle or shaft) to repeat the cycle. On the other hand, when the wind speed is less than the predetermined threshold, additional thrust may be necessary for optimal electricity generation, and the method may return to 815 to repeat the cycle.

Exemplary Software and/or Methods of Controlling a Rotary Turbine

The present disclosure also includes algorithms, computer program(s), computer-readable media and/or software, implementable and/or executable in a general purpose computer or workstation equipped with a conventional digital signal processor, and configured to perform one or more of the method(s) and/or one or more operations of the engine(s) disclosed herein. Thus, a further aspect of the invention relates to algorithms and/or software that control an engine (e.g., configured to generate electricity or to propel a vehicle) and/or that implement part or all of any method disclosed herein. For example, the computer program or computer-readable medium generally contains a set of instructions which, when executed by an appropriate processing device (e.g., a signal processing device, such as a microcontroller, microprocessor or DSP device), is configured to perform the above-described method(s), operation(s), and/or algorithm(s).

The computer-readable medium may comprise any medium that can be read by a signal processing device configured to read the medium and execute code stored thereon or therein, such as a floppy disk, CD-ROM, magnetic tape or hard disk drive. Such code may comprise object code, source code and/or binary code. The code is generally digital, and is generally configured for processing by a conventional digital data processor (e.g., a microprocessor, microcontroller, or logic circuit such as a programmable gate array, programmable logic circuit/device or application-specific integrated circuit [ASIC]).

Thus, an aspect of the present invention relates to a non-transitory computer-readable medium, comprising a set of instructions encoded thereon adapted to control the igniters, the pump(s), the fuel injectors, the valves or gates, the brake, the yaw motor, the battery or batteries, the generator, a door or gate that can cover the opening in a corresponding blade, and in some embodiments, the transmission or differential. In some embodiments (e.g., in the horizontal engine), since the transmission/differential/gear box, the generator, the brake, and the yaw motor are housed in or near a nacelle, the signal processing device and the computer-readable medium may also be housed in the nacelle. Alternatively, the computer-readable medium may be stored in a remote storage medium, to be executed by a remote general purpose computer that transmits the instructions (or control signals resulting from execution of the instructions) to the controller in the nacelle (or elsewhere in or near the engine, when the engine is a vertical engine).

In some embodiments, the engine further comprises an anemometer, and the computer-readable medium controls (i) ignition, combustion or detonation of the fuel (i.e., the igniters), (ii) the yaw motor (and thus, the direction of the hub and the axle or shaft), (iii) the brake, (iv) the generator, (v) an inverter or converter configured to transfer the generated electricity to an electrical grid, (vi) the pitch of the blades (in engines that include a pitch motor configured to maintain or change a pitch of one or more blades), (vii) the pump(s), (viii) any doors or gates configured to open and close the opening in the blades (when present), and/or (ix) the transmission or differential (in engines that include a transmission or differential) based at least in part on the wind speed and/or wind direction measured by the anemometer. The computer-readable medium may control such devices based at least in part on other criteria, such as a predetermined rotational speed of the rotor, a temperature of the combustion chambers, a temperature of the generator, etc.

Typically, when the wind speed is at or below a first predetermined threshold, the signal processor executing the instructions in the computer-readable medium sends a first signal to a first device, and when the wind speed is at or above the first predetermined threshold, the signal processor sends a second, different signal to the first device. For example, when the wind speed is below 3 m/s, the instructions may instruct the signal processor to cause (i) the pump(s) to provide a dose (e.g., a predetermined amount) of fuel to the combustion chambers (periodically or continuously), (ii) a battery to send a charge to the igniters periodically to ignite the igniters, and (iii) when the engine includes doors or gates to open and close the openings in the blades, open the doors or gates. In addition, when the wind speed is greater than 3 m/s, the instructions may instruct the signal processor to stop the pump(s), electrically disconnect the battery (e.g., stop sending charges to the igniters), and when the engine includes doors or gates to open and close the openings in the blades, close the doors or gates. In further embodiments, the second signal (e.g., to stop the pump[s] and electrically disconnect the battery) can be sent in response to a different threshold event (e.g., the wind speed exceeding 5 m/s), and the instructions may instruct the signal processor to perform a different task (e.g., to send the charge to the igniters at a lower frequency, to inject a smaller dose of fuel into the combustion chambers, etc.). For example, the instructions may supply the fuel to the combustion chambers at a frequency of 0.5-10 times per second during the low-wind condition, but at a lower frequency (e.g., 0.1-1 times per second) during the intermediate wind condition (e.g., between 3 and 5 m/s).

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An engine, comprising:
   a) a rotary hub enclosing a manifold, the manifold receiving a fuel supply conduit and having a plurality of outlets, each connected to one of a corresponding plurality of fuel distribution conduits;
   b) a plurality of blades, radially distributed around the hub, each of said blades having (i) a first end joined or fixed to the hub, (ii) a passage for air to flow to a second, distal end of the blade, (iii) one of the fuel distribution conduits therein or thereon, and (iv) a combustion chamber at the second, distal end of the blade, each said combustion chamber being configured to (I) receive fuel from a corresponding one of the fuel distribution conduits and air from the passage in the corresponding one of the blades, (II) burn or detonate the fuel, and (III) direct heated or expanded air and combustion gases in a direction that rotates the blades and the hub;
   c) an axle or shaft joined or fixed to the hub, configured to rotate with the hub; and
   d) a generator operably connected to the axle or shaft, configured to convert a torque from the axle or shaft to electricity;
   e) an anemometer, configured to measure a wind speed; and
   f) a controller configured to control one or more operations of the engine based at least in part on the wind speed.

2. The engine of claim 1, further comprising a housing configured to house and/or isolate the generator, wherein the housing includes a roof or upper frame and a plurality of supports that support the roof or upper frame above the generator.

3. The engine of claim 2, wherein the axle or shaft extends from the hub, through the roof or upper frame, and the roof or upper frame secures a first bearing configured to seal the axle or shaft and allow the axle or shaft to rotate.

4. The engine of claim 2, wherein the plurality of supports are on a substantially flat or planar surface.

5. The engine of claim 3, wherein the axle or shaft rotates in position without lateral movement.

6. The engine of claim 1, further comprising a tower configured to support the rotary hub, the blades, and the axle or shaft.

7. The engine of claim 6, further comprising a transmission, differential and/or gear box configured to transfer the torque from the axle or shaft to a high-speed shaft adapted to rotate at a faster rate than the axle or shaft.

8. The engine of claim 1, wherein each of the plurality of combustion chambers comprises a nozzle at an end thereof, configured to direct the heated or expanded air and combustion gases exiting the combustion chamber in a direction (i) tangential or substantially tangential to a circle defined by rotational movement of the combustion chamber or (ii) perpendicular or substantially perpendicular to a central axis of the corresponding blade.

9. The engine of claim 8, further comprising a constriction at an inlet of each of the plurality of nozzles.

10. The engine of claim 1, further comprising (i) a fuel storage tank or vessel, and (ii) a pump configured to receive the fuel from the fuel storage tank or vessel, and output the fuel into the fuel supply conduit.

11. The engine of claim 1, wherein each of the plurality of combustion chambers comprises (i) an outer shell with an opening or port therein configured to receive the corresponding fuel distribution conduit or allow the corresponding fuel distribution conduit to pass through the outer shell, and (ii) an inner wall inside the outer shell, having a plurality of openings therein configured to allow the air to pass through the inner wall, the outer shell and the inner wall having a channel between them through which the air flows, and the inner wall defining a zone in which the fuel is ignited or burned.

12. The engine of claim 1, wherein each of the plurality of blades has an opening on a side of the blade facing a direction of rotation that allows the air to enter the passage.

13. The engine of claim 1, wherein the controller controls ignition, combustion or detonation of the fuel.

14. A method of generating electricity, comprising:
a) igniting, burning or detonating a fuel in a plurality of combustion chambers, each at a distal end of a corresponding one of a plurality of blades connected to and radially distributed around a rotary hub;
b) expelling (i) air heated or expanded in the plurality of combustion chambers and (ii) combustion gases from the plurality of combustion chambers in a direction that rotates the blades and the hub;
c) flowing the air through a passage in each of the plurality of blades to the plurality of combustion chambers;
d) distributing the fuel from a manifold in the hub to the plurality of combustion chambers through a corresponding plurality of fuel distribution conduits in or on the corresponding ones of the plurality of blades;
e) measuring a wind speed with an anemometer, and controlling ignition, combustion or detonation of the fuel based at least in part on the wind speed;
f) rotating an axle or shaft joined or fixed to the hub to generate a torque; and
g) converting the torque to electricity using a generator.

15. The method of claim 14, further comprising transferring the torque from the axle or shaft to a high-speed shaft using a transmission, differential and/or gear box, wherein the high-speed shaft rotates at a faster rate than that of the axle or shaft.

16. The method of claim 14, further comprising directing the heated or expanded air and combustion gases through a nozzle at an end of a corresponding one of the plurality of combustion chambers in a direction (i) tangential or substantially tangential to a circle defined by rotational movement of the combustion chamber or (ii) perpendicular or substantially perpendicular to a central axis of the corresponding blade.

17. The method of claim 14, further comprising pumping the fuel from a fuel storage tank or vessel into a fuel supply conduit in fluid communication with the manifold.

18. The method of claim 14, wherein each of the combustion chambers comprises an outer shell and an inner wall inside the outer shell, and the method further comprises (i) flowing the air into a channel between the outer shell and the inner wall, (ii) allowing at least some of air heated in the channel to exit the combustion chamber through an outlet outside of the nozzle, (iii) passing some of the air through a plurality of openings in the inner wall, and (iv) igniting or burning the fuel in a zone within the inner wall.

19. The method of claim 14, further comprising igniting the fuel in the combustion chambers using a corresponding plurality of igniters, and providing an electrical charge to each of said igniters.

* * * * *